United States Patent
Hughes et al.

(10) Patent No.: US 11,294,670 B2
(45) Date of Patent: Apr. 5, 2022

(54) METHOD AND APPARATUS FOR PERFORMING REDUCTION OPERATIONS ON A PLURALITY OF ASSOCIATED DATA ELEMENT VALUES

(71) Applicant: Intel Corporation, Santa Clara, CA (US)

(72) Inventors: Christopher J. Hughes, Santa Clara, CA (US); Jonathan D. Pearce, Hillsboro, OR (US); Guei-Yuan Lueh, San Jose, CA (US); ElMoustapha Ould-Ahmed-Vall, Chandler, AZ (US); Jorge E. Parra, El Dorado Hills, CA (US); Prasoonkumar Surti, Folsom, CA (US); Krishna N. Vinod, San Jose, CA (US); Ronen Zohar, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 28 days.

(21) Appl. No.: 16/366,155

(22) Filed: Mar. 27, 2019

(65) Prior Publication Data

US 2020/0310809 A1    Oct. 1, 2020

(51) Int. Cl.
*G06F 9/30*    (2018.01)
*G06F 9/38*    (2018.01)

(52) U.S. Cl.
CPC ........ *G06F 9/3001* (2013.01); *G06F 9/30018* (2013.01); *G06F 9/30021* (2013.01); *G06F 9/30036* (2013.01); *G06F 9/3887* (2013.01)

(58) Field of Classification Search
CPC .. G06F 9/30036; G06F 9/3887; G06F 9/3002; G06F 9/30018; G06F 9/30087; G06F 9/3001; G06F 9/30021; G06T 1/20
See application file for complete search history.

(56) References Cited

U.S. PATENT DOCUMENTS

| | | | |
|---|---|---|---|
| 2002/0087955 A1* | 7/2002 | Ronen ............... | G06F 9/3001 717/151 |
| 2011/0078417 A1* | 3/2011 | Fahs ............... | G06F 9/30087 712/216 |

(Continued)

OTHER PUBLICATIONS

John Hennessy and David Patterson, Computer Architecture a Quantitative Approach, Elsevier, Fifth Edition, pp. C-34 to C-37 (Year: 2012).*

(Continued)

*Primary Examiner* — Courtney P Carmichael-Moody
(74) *Attorney, Agent, or Firm* — Nicholson De Vos Webster & Elliott LLP

(57) ABSTRACT

Embodiments detailed herein relate to reduction operations on a plurality of data element values. In one embodiment, a process comprises decoding circuitry to decode an instruction and execution circuitry to execute the decoded instruction. The instruction specifies a first input register containing a plurality of data element values, a first index register containing a plurality of indices, and an output register, where each index of the plurality of indices maps to one unique data element position of the first input register. The execution includes to identify data element values that are associated with one another based on the indices, perform one or more reduction operations on the associated data element values based on the identification, and store results of the one or more reduction operations in the output register.

18 Claims, 31 Drawing Sheets

(56) References Cited

U.S. PATENT DOCUMENTS

| | | | |
|---|---|---|---|
| 2013/0311530 A1* | 11/2013 | Lee | G06F 9/30145 |
| | | | 708/441 |
| 2014/0189288 A1* | 7/2014 | Hartono | G06F 9/3455 |
| | | | 712/5 |
| 2015/0052330 A1* | 2/2015 | Ingle | G06F 9/3887 |
| | | | 712/2 |
| 2016/0179537 A1* | 6/2016 | Kunzman | G06F 9/30036 |
| | | | 712/7 |
| 2016/0224346 A1* | 8/2016 | Moudgill | G06F 15/7828 |
| 2017/0168819 A1* | 6/2017 | Brown | G06F 9/3893 |
| 2018/0285316 A1 | 10/2018 | Thorson et al. | |
| 2020/0364056 A1* | 11/2020 | Fleischer | G06F 9/3826 |

OTHER PUBLICATIONS

European Search Report and Search Opinion, EP App. No. 20158409.1, dated Sep. 2, 2020, 10 pages.

* cited by examiner

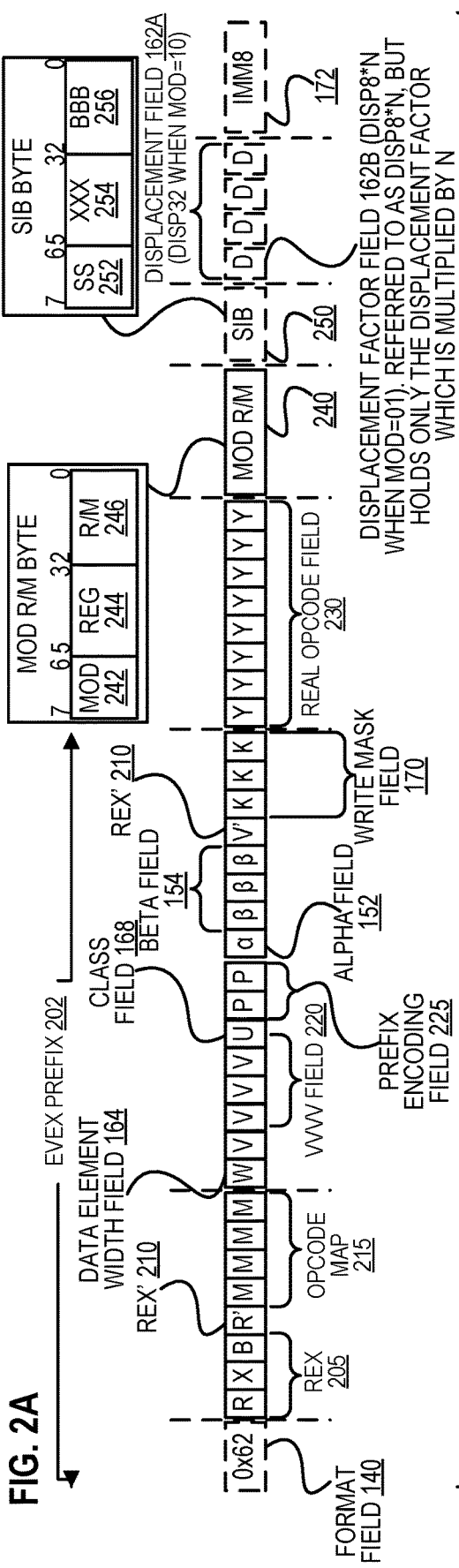
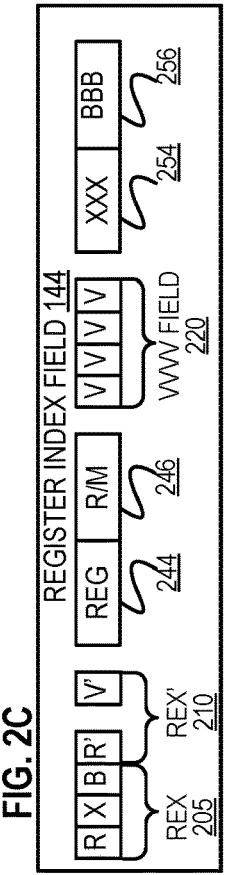
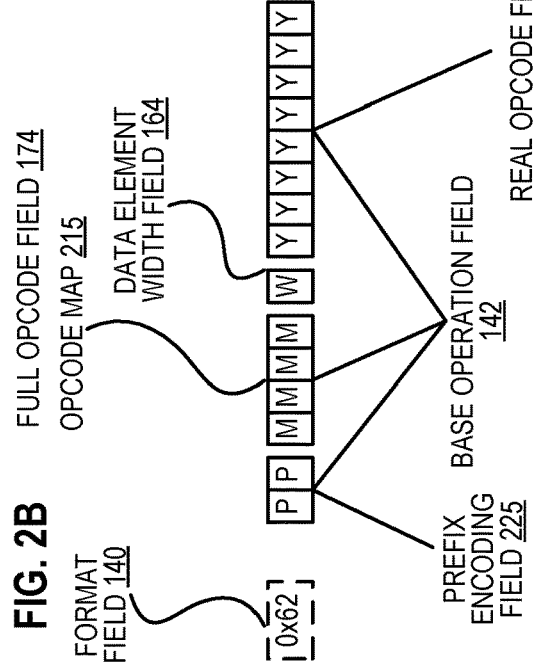
FIG. 2A
FIG. 2B
FIG. 2C

FIG. 3
REGISTER ARCHITECTURE 300
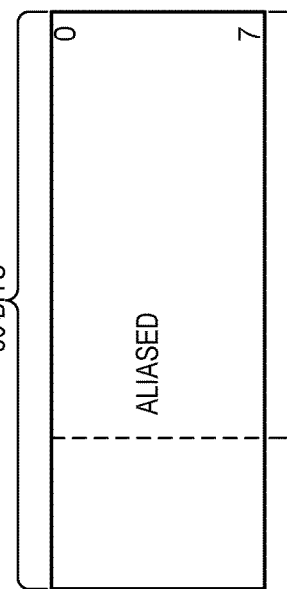
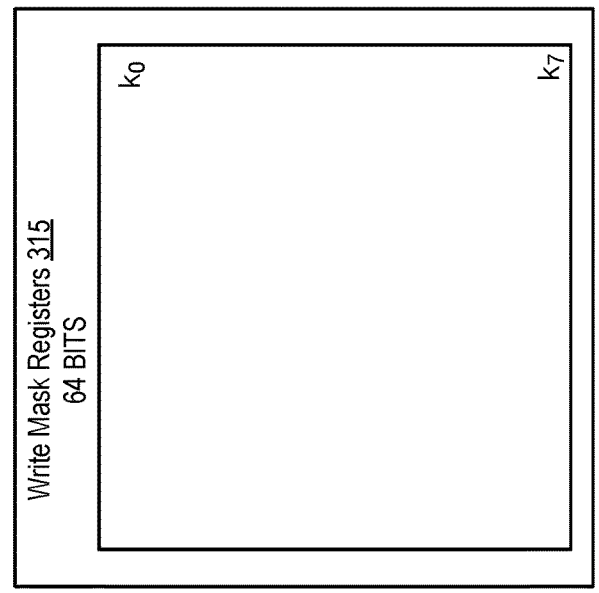
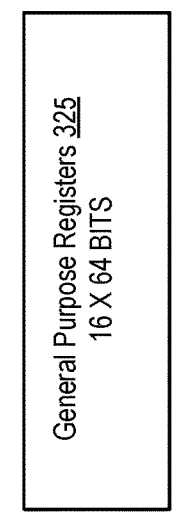
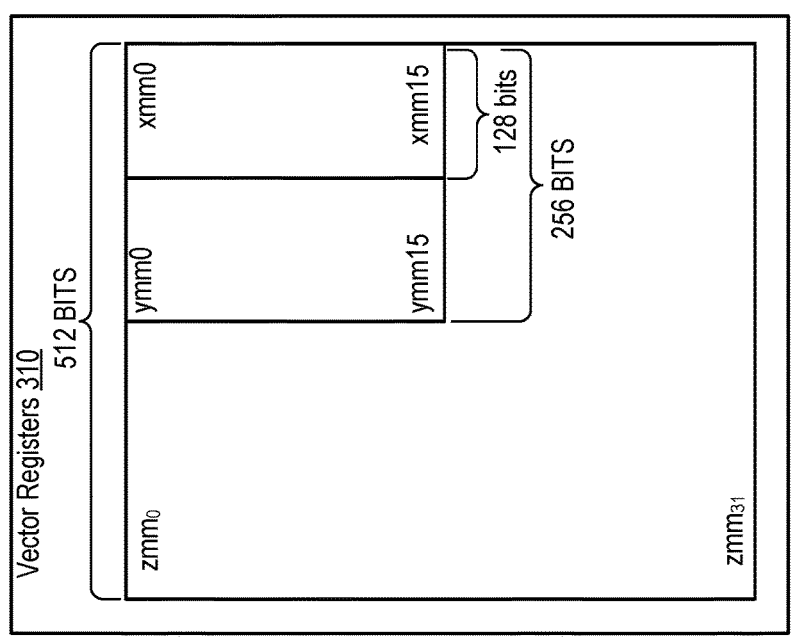

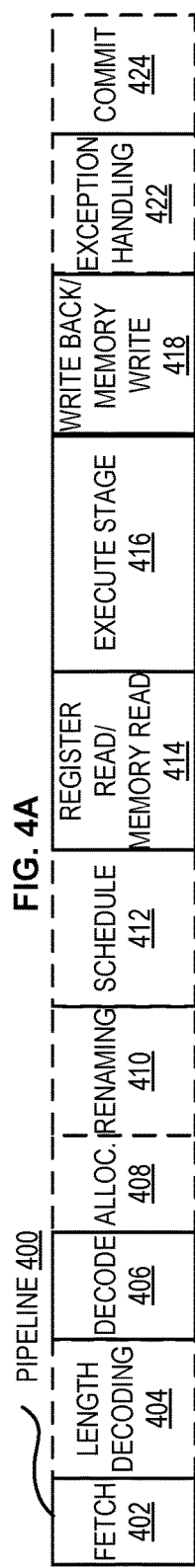
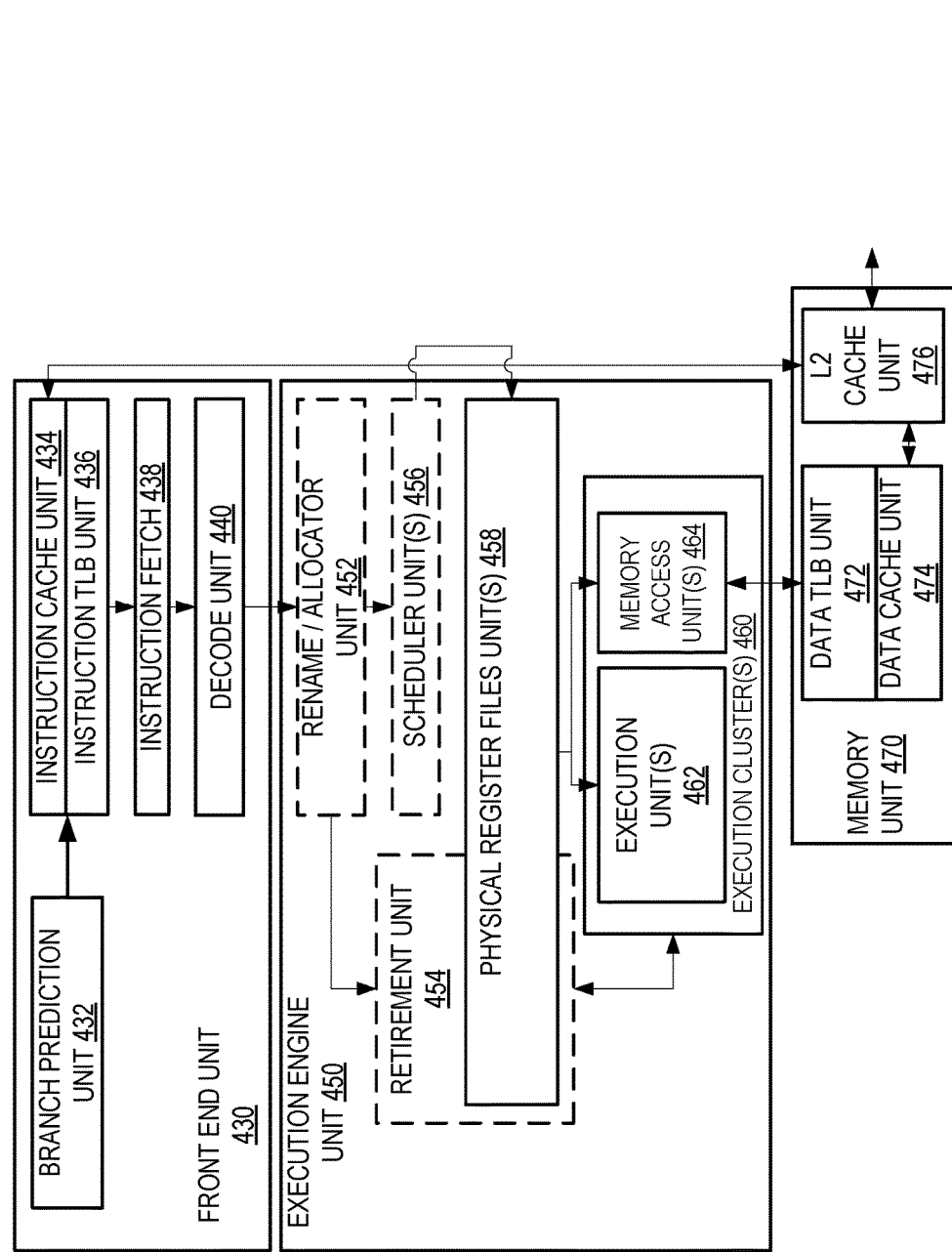

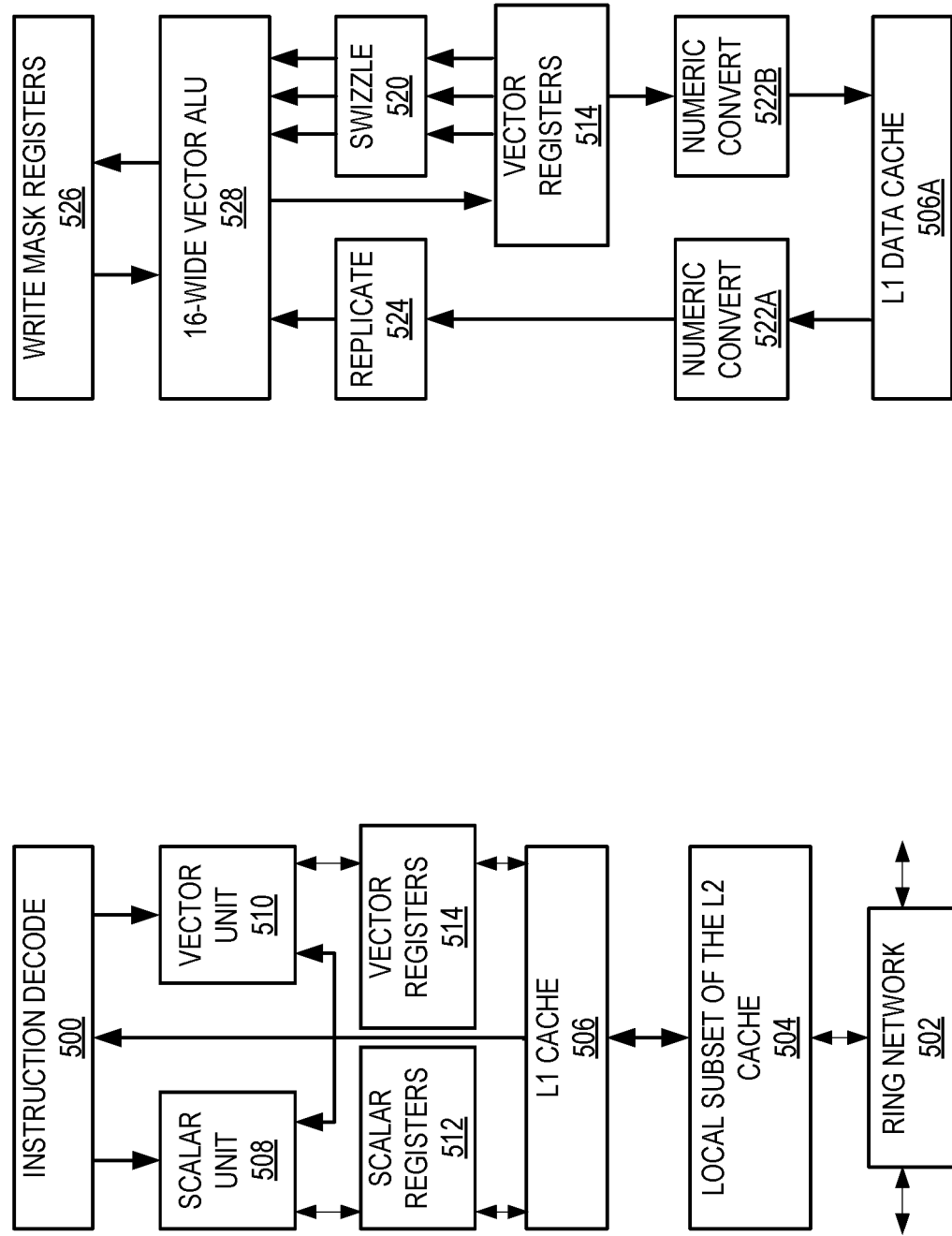

METHOD AND APPARATUS FOR PERFORMING REDUCTION OPERATIONS ON A PLURALITY OF ASSOCIATED DATA ELEMENT VALUES

TECHNICAL FIELD

Embodiments of the invention relate to the field of computer processor architecture; and more specifically, to perform reduction operations on a plurality of data element values.

BACKGROUND ART

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

BRIEF DESCRIPTION OF THE DRAWINGS

The invention may best be understood by referring to the following description and accompanying drawings that are used to show embodiments of the invention. In the drawings:

FIGS. 2A-D are block diagrams showing an exemplary specific vector friendly instruction format according to embodiments of the invention.

FIG. 3 is a block diagram of a register architecture according to one embodiment of the invention.

FIG. 4A is a block diagram showing both an exemplary in-order pipeline and an exemplary register renaming, out-of-order issue/execution pipeline according to embodiments of the invention.

FIG. 4B is a block diagram showing both an exemplary embodiment of an in-order architecture core and an exemplary register renaming, out-of-order issue/execution architecture core to be included in a processor according to embodiments of the invention.

FIG. 5A is a block diagram of a single processor core, along with its connection to the on-die interconnect network and with its local subset of the Level 2 (L2) cache, according to embodiments of the invention.

FIG. 5B is an expanded view of part of the processor core in FIG. 5A according to embodiments of the invention.

DETAILED DESCRIPTION

Figure 1A:
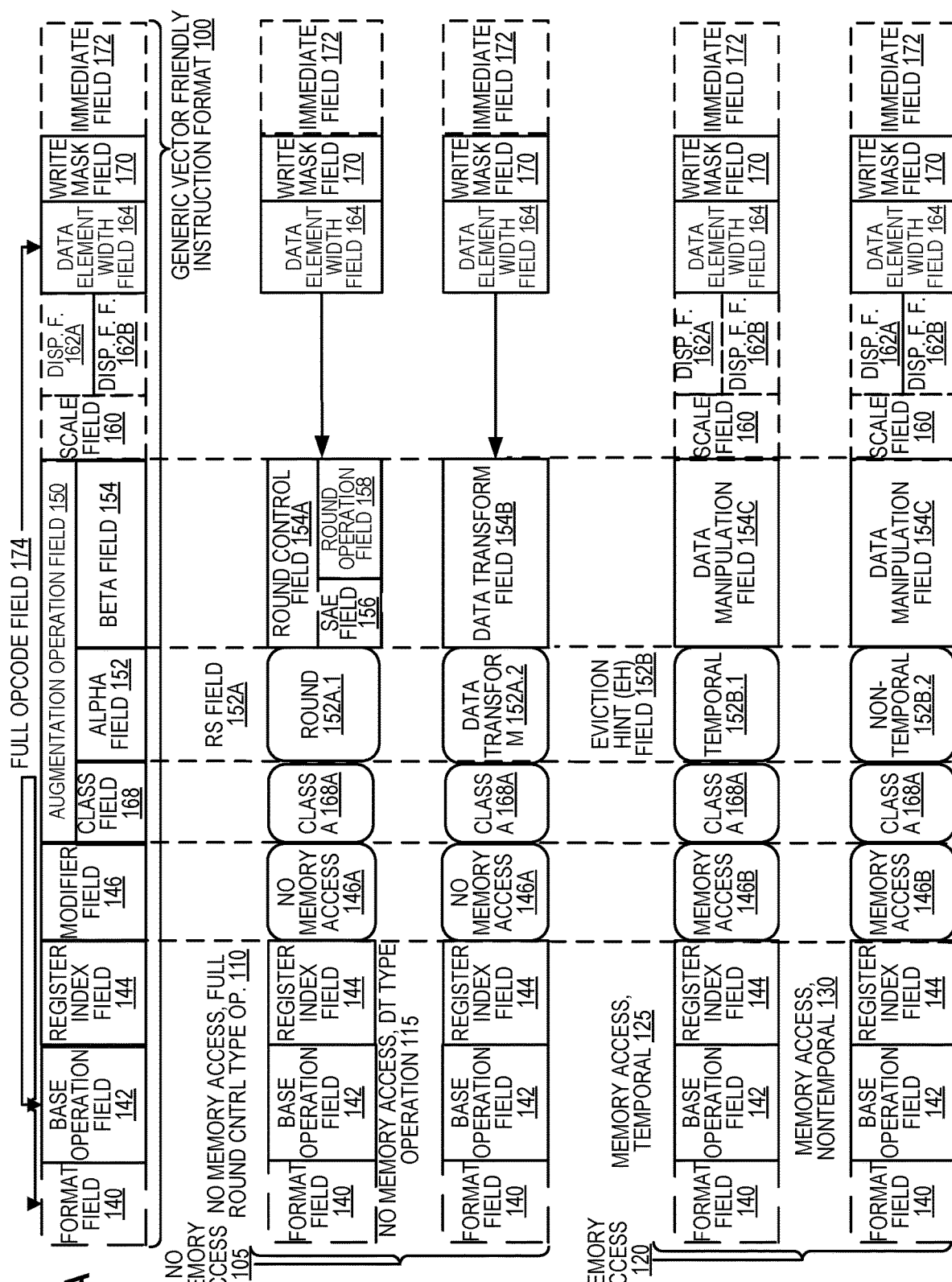
FIGS. 1A and 1B are block diagrams showing a generic vector friendly instruction format and instruction templates thereof according to embodiments of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
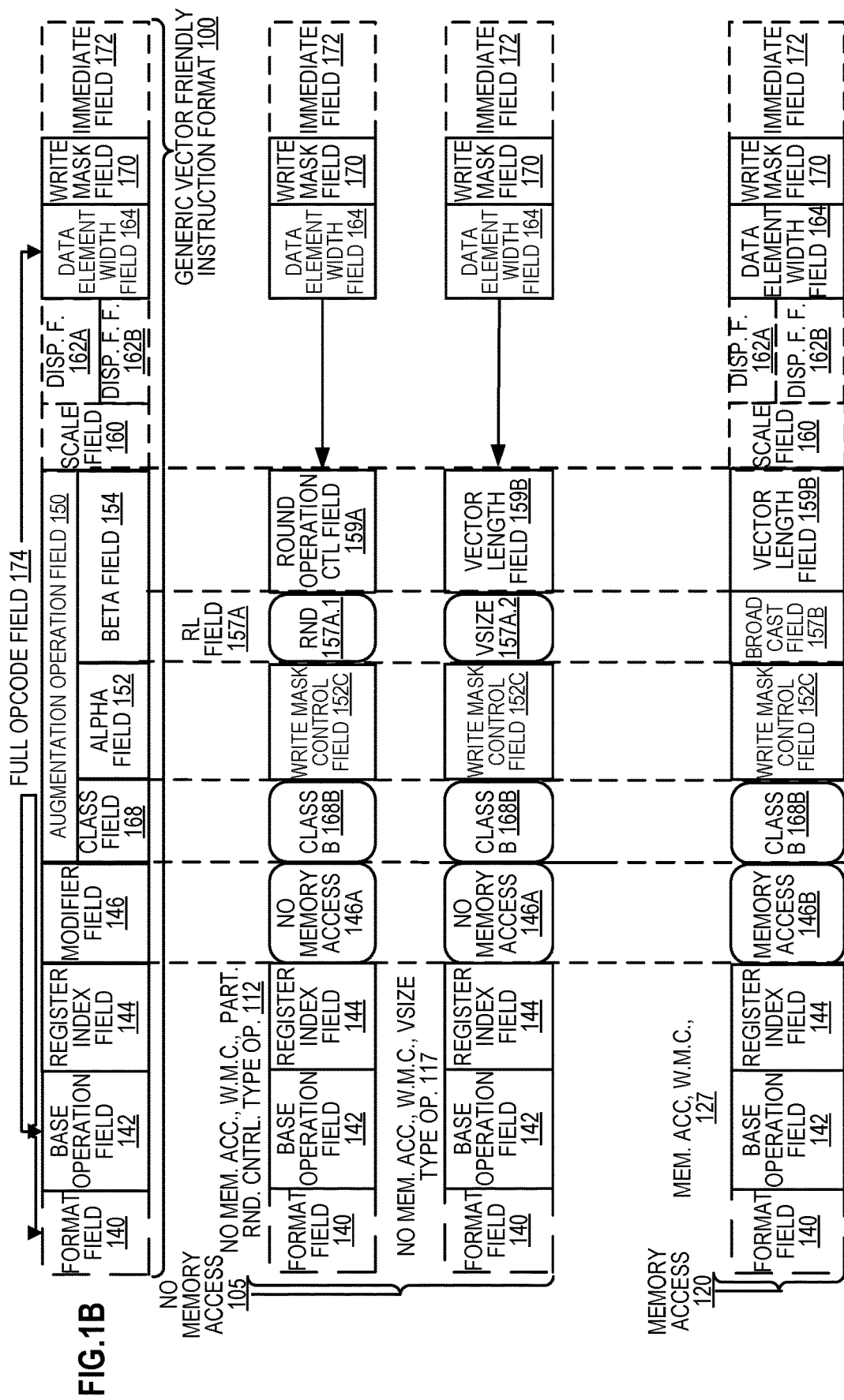

FIGS. 1A-1B are block diagrams showing a generic vector friendly instruction format and instruction templates thereof according to embodiments of the invention. FIG. 1A is a block diagram showing a generic vector friendly instruction format and class A instruction templates thereof according to embodiments of the invention; while FIG. 1B is a block diagram showing the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order shown in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}$*index+base).

Displacement Field 162A—its content is used as part of memory address generation (e.g., for address generation that uses $2^{scale}$*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement factor field 162B (sometimes referred to as displacement scale field) are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a Suppress All (floating point) Exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 158 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement factor field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement factor field 162B are not present.

In the no memory access, write mask control, partial round control type operation 110 instruction template, the rest of the beta field 154 is interpreted as a round operation control field 159A and exception event reporting is disabled (a given instruction does not report any kind of floating-point exception flag and does not raise any floating-point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 159 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general-purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high performance general-purpose cores with out of order execution and register renaming intended for general-purpose computing that support only class B. Another processor that does not have a separate graphics core, may include one more general-purpose in-order or out-of-order cores that support both class A and class B. Of course, features from one class may also be implement in the other class in different embodiments of the invention. Programs written in a high-level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIG. 2A-D are block diagrams showing an exemplary specific vector friendly instruction format according to embodiments of the invention. FIG. 2 shows a specific vector friendly instruction format 200 that is specific in the sense that it specifies the location, size, interpretation, and order of the fields, as well as values for some of those fields. The specific vector friendly instruction format 200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 1 into which the fields from FIG. 2 map are shown.

It should be understood that, although embodiments of the invention are described with reference to the specific vector friendly instruction format 200 in the context of the generic vector friendly instruction format 100 for illustrative purposes, the invention is not limited to the specific vector friendly instruction format 200 except where claimed. For example, the generic vector friendly instruction format 100 contemplates a variety of possible sizes for the various fields, while the specific vector friendly instruction format 200 is shown as having fields of specific sizes. By way of specific example, while the data element width field 164 is shown as a one-bit field in the specific vector friendly instruction format 200, the invention is not so limited (that is, the generic vector friendly instruction format 100 contemplates other sizes of the data element width field 164).

The generic vector friendly instruction format 100 includes the following fields listed below in the order shown in FIG. 2A.

EVEX Prefix (Bytes 0-3) 202—is encoded in a four-byte form.

Format Field 140 (EVEX Byte 0, bits[7:0])—the first byte (EVEX Byte 0) is the format field 140 and it contains 0x62 (the unique value used for distinguishing the vector friendly instruction format in one embodiment of the invention).

The second-fourth bytes (EVEX Bytes 1-3) include a number of bit fields providing specific capability.

REX field 205 (EVEX Byte 1, bits [7-5])—consists of a EVEX.R bit field (EVEX Byte 1, bit [7]—R), EVEX.X bit field (EVEX byte 1, bit [6]—X), and 1157BEX byte 1, bit [5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 210—this is the first part of the REX' field 210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 215 (EVEX byte 1, bits [3:0]—mmmm)—its content encodes an implied leading opcode byte (0F, 0F 38, or 0F 3).

Data element width field 164 (EVEX byte 2, bit [7]—W)—is represented by the notation EVEX.W. EVEX.W is used to define the granularity (size) of the datatype (either 32-bit data elements or 64-bit data elements).

EVEX.vvvv 220 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 220 encodes the 4 low-order bits of the first source register specifier stored in inverted (1s complement) form. Depending on the instruction, an extra different EVEX bit field is used to extend the specifier size to 32 registers.

EVEX.U 168 Class field (EVEX byte 2, bit [2]—U)—If EVEX.U=0, it indicates class A or EVEX.U0; if EVEX.0=1, it indicates class B or EVEX.U1.

Prefix encoding field 225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 152 (EVEX byte 3, bit [7]—EH; also known as EVEX.EH, EVEX.rs, EVEX.RL, EVEX.write mask control, and EVEX.N; also shown with α)—as previously described, this field is context specific.

Beta field 154 (EVEX byte 3, bits [6:4]—SSS, also known as $EVEX.s_{2-0}$, $EVEX.r_{2-0}$, EVEX.rr1, EVEX.LL0, EVEX.LLB; also shown with βββ)—as previously described, this field is context specific.

REX' field 210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.VVVV.

Write mask field 170 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 230 (Byte 4) is also known as the opcode byte. Part of the opcode is specified in this field.

MOD R/M Field 240 (Byte 5) includes MOD field 242, Reg field 244, and R/M field 246. As previously described, the MOD field's 242 content distinguishes between memory access and non-memory access operations. The role of Reg field 244 can be summarized to two situations: encoding either the destination register operand or a source register operand, or be treated as an opcode extension and not used to encode any instruction operand. The role of R/M field 246 may include the following: encoding the instruction operand that references a memory address, or encoding either the destination register operand or a source register operand.

Scale, Index, Base (SIB) Byte (Byte 6)—As previously described, the scale field's 150 content is used for memory address generation. SIB.xxx 254 and SIB.bbb 256—the contents of these fields have been previously referred to with regard to the register indexes Xxxx and Bbbb.

Displacement field 162A (Bytes 7-10)—when MOD field 242 contains 10, bytes 7-10 are the displacement field 162A, and it works the same as the legacy 32-bit displacement (disp32) and works at byte granularity.

Displacement factor field 162B (Byte 7)—when MOD field 242 contains 01, byte 7 is the displacement factor field 162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 162B is a reinterpretation of disp8; when using displacement factor field 162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 162B substitutes the legacy x86 instruction set 8-bit displacement. Thus, the displacement factor field 162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 172 operates as previously described.

Full Opcode Field

FIG. 2B is a block diagram showing the fields of the specific vector friendly instruction format 200 that make up the full opcode field 174 according to one embodiment of the invention. Specifically, the full opcode field 174 includes the format field 140, the base operation field 142, and the data element width (W) field 164. The base operation field 142 includes the prefix encoding field 225, the opcode map field 215, and the real opcode field 230.

Register Index Field

FIG. 2C is a block diagram showing the fields of the specific vector friendly instruction format 200 that make up the register index field 144 according to one embodiment of the invention. Specifically, the register index field 144 includes the REX field 205, the REX' field 210, the MODR/M.reg field 244, the MODR/M.r/m field 246, the VVVV field 220, xxx field 254, and the bbb field 256.

Augmentation Operation Field

Figure 2D:
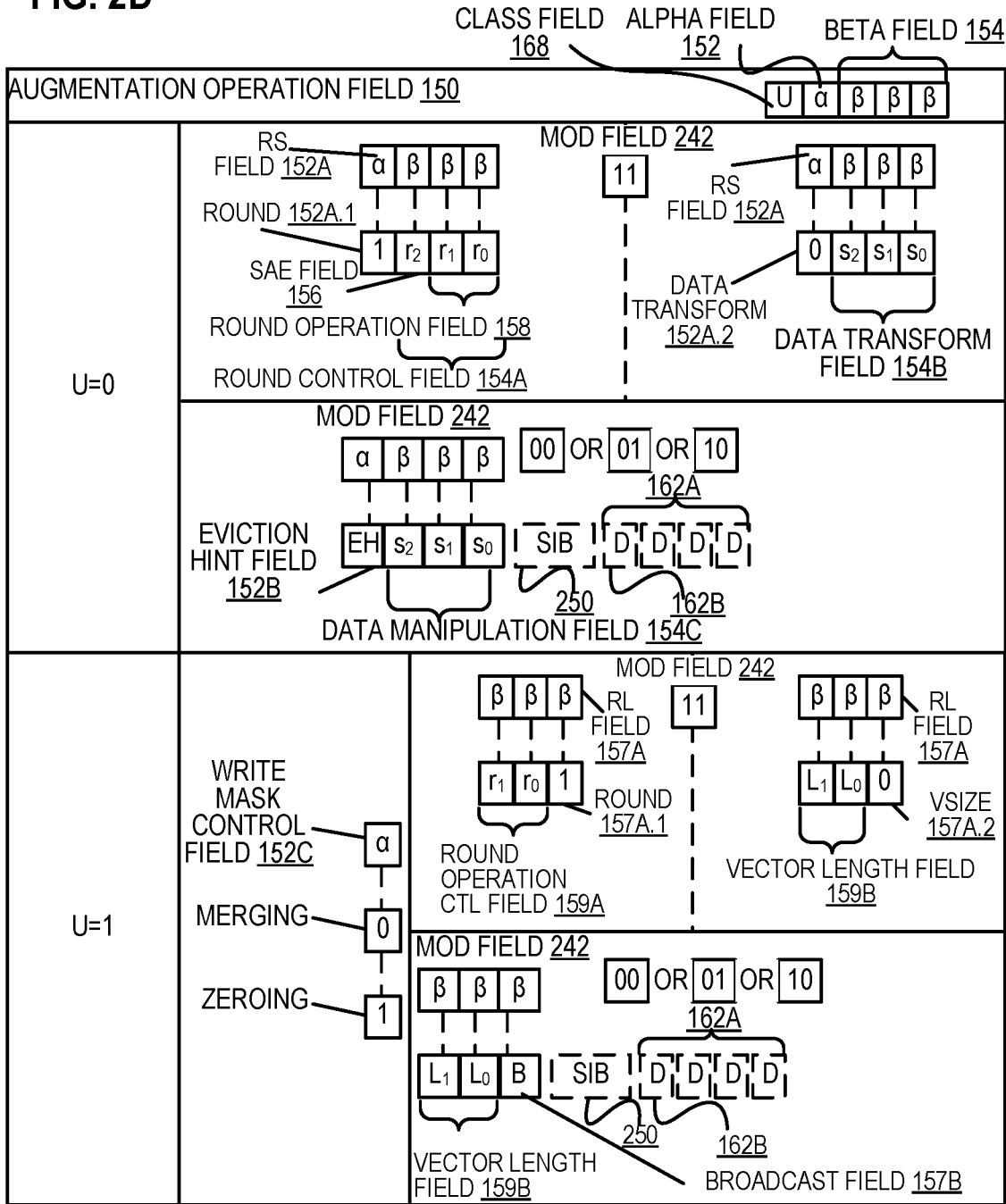

FIG. 2D is a block diagram showing the fields of the specific vector friendly instruction format 200 that make up the augmentation operation field 150 according to one embodiment of the invention. When the class (U) field 168 contains 0, it signifies EVEX.U0 (class A 168A); when it contains 1, it signifies EVEX.U1 (class B 168B). When U=0 and the MOD field 242 contains 11 (signifying a no memory access operation), the alpha field 152 (EVEX byte 3, bit [7]—EH) is interpreted as the rs field 152A. When the rs field 152A contains a 1 (round 152A.1), the beta field 154 (EVEX byte 3, bits [6:4]—SSS) is interpreted as the round control field 154A. The round control field 154A includes a one-bit SAE field 156 and a two-bit round operation field 158. When the rs field 152A contains a 0 (data transform 152A.2), the beta field 154 (EVEX byte 3, bits [6:4]—SSS) is interpreted as a three-bit data transform field 154B. When U=0 and the MOD field 242 contains 00, 01, or 10 (signifying a memory access operation), the alpha field 152 (EVEX byte 3, bit [7]—EH) is interpreted as the eviction hint (EH) field 152B and the beta field 154 (EVEX byte 3, bits [6:4]—SSS) is interpreted as a three bit data manipulation field 154C.

When U=1, the alpha field 152 (EVEX byte 3, bit [7]—EH) is interpreted as the write mask control (Z) field 152C. When U=1 and the MOD field 242 contains 11 (signifying a no memory access operation), part of the beta field 154 (EVEX byte 3, bit [4]—S$_0$) is interpreted as the RL field 157A; when it contains a 1 (round 157A.1) the rest of the beta field 154 (EVEX byte 3, bit [6-5]—S$_{2-1}$) is interpreted as the round operation control field 159A, while when the RL field 157A contains a 0 (VSIZE 157.A2) the rest of the beta field 154 (EVEX byte 3, bit [6-5]—S$_{2-1}$) is interpreted as the vector length field 159B (EVEX byte 3, bit [6-5]—L$_{1-0}$). When U=1 and the MOD field 242 contains 00, 01, or 10 (signifying a memory access operation), the beta field 154 (EVEX byte 3, bits [6:4]—SSS) is interpreted as the vector length field 159B (EVEX byte 3, bit [6-5]—L$_{1-0}$) and the broadcast field 157B (EVEX byte 3, bit [4]—B).

FIG. 3 is a block diagram of a register architecture 300 according to one embodiment of the invention. In the embodiment shown, there are 32 vector registers 310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 200 operates on these overlaid register file as shown in the table below.

| Adjustable Vector Length | Class | Operations | Registers |
|---|---|---|---|
| Instruction Templates that do not include the vector length field 159B | A (FIG. 1A; U = 0) | 110, 115, 125, 130 | zmm registers (the vector length is 64 byte) |
| | B (FIG. 1B; U = 1) | 112 | zmm registers (the vector length is 64 byte) |
| Instruction Templates that do include the vector length field 159B | B (FIG. 1B; U = 1) | 117, 127 | zmm, ymm, or xmm registers (the vector length is 64-byte, 32-byte, or 16-byte) depending on the vector length field 159B |

In other words, the vector length field 159B selects between a maximum length and one or more other shorter lengths, where each such shorter length is half the length of the preceding length; and instructions templates without the vector length field 159B operate on the maximum vector length. Further, in one embodiment, the class B instruction templates of the specific vector friendly instruction format 200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 315—in the embodiment shown, there are 8 write mask registers (k0 through k7), each 64 bits in size. In an alternate embodiment, the write mask registers 315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 325—in the embodiment shown, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment shown, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Processor Architectures and Data Types

FIG. 4A is a block diagram showing both an exemplary in-order pipeline and an exemplary register renaming, out-of-order issue/execution pipeline according to embodiments of the invention. FIG. 4B is a block diagram showing both an exemplary embodiment of an in-order architecture core and an exemplary register renaming, out-of-order issue/execution architecture core to be included in a processor according to embodiments of the invention. The solid lined boxes in FIGS. 4A-B show the in-order pipeline and in-order core, while the optional addition of the dashed lined boxes shows the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 10, a scheduling (also known as a dispatch or issue) stage 12, a register read/memory read stage 14, an execute stage 16, a write back/memory write stage 18, an exception handling stage 22, and a commit stage 24. Each stage may include circuitry to perform the operations in the stage, and the circuitry may be referred to as fetch circuitry, decoding circuitry, scheduling circuitry, execution circuitry, and etc. to denote that hardware circuits are used to implement these stages.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general-purpose computing graphics processing unit (GPGPU) core, graphics core, or the like.

The front-end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 30). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to show various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2, Advanced Matrix Extensions (AMX), and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 34/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 5A-B show a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 5B is an expanded view of part of the processor core in FIG. 5A according to embodiments of the invention. FIG. 5B includes an L1 data cache 506A part of the L2 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
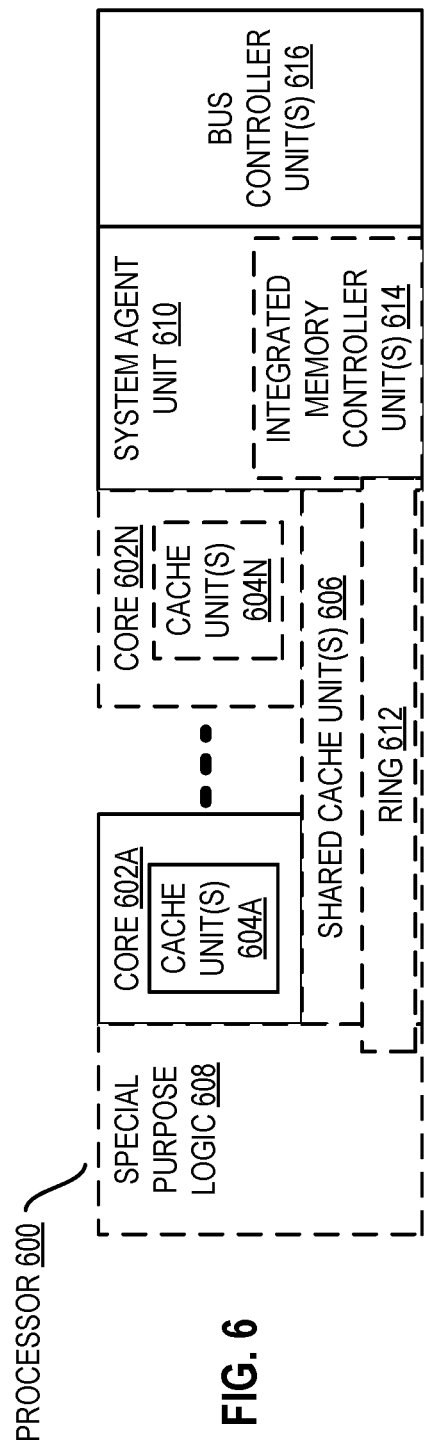
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 show a processor 600 with a single core 602A, a system agent 610, a set of one or more bus controller units 616, while the optional addition of the dashed lined boxes shows an alternative processor 600 with multiple cores 602A-N (which may include one or more cache units 604A-N), a set of one or more integrated memory controller unit(s) 614 in the system agent unit 610, and special purpose logic 608 (e.g., integrated graphics logic).

Thus, different implementations of the processor 600 may include: 1) a CPU with the special purpose logic 608 being integrated graphics and/or scientific (throughput) logic (which may include one or more cores), and the cores 602A-N being one or more general-purpose cores (e.g., general-purpose in-order cores, general-purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general-purpose in-order cores. Thus, the processor 600 may be a general-purpose processor, coprocessor or special-purpose processor, such as, for example, a network or communication processor, compression engine, graphics processor, GPGPU (general-purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring-based interconnect unit 612 interconnects the special purpose logic 608, the set of shared cache units 606, and the system agent unit 610/integrated memory controller unit(s) 614, alternative embodiments may use any number of well-known techniques for interconnecting such units. In one embodiment, coherency is maintained between one or more shared cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the special purpose logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
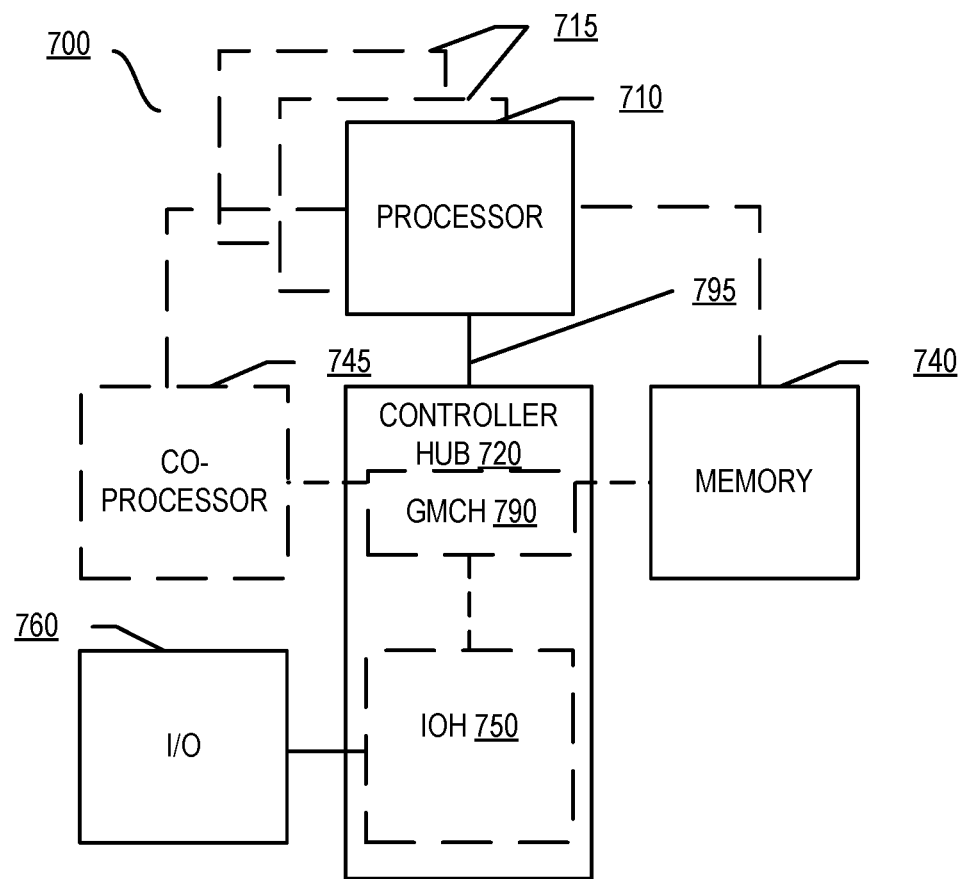
FIG. 7 shows a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random-access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the processors 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
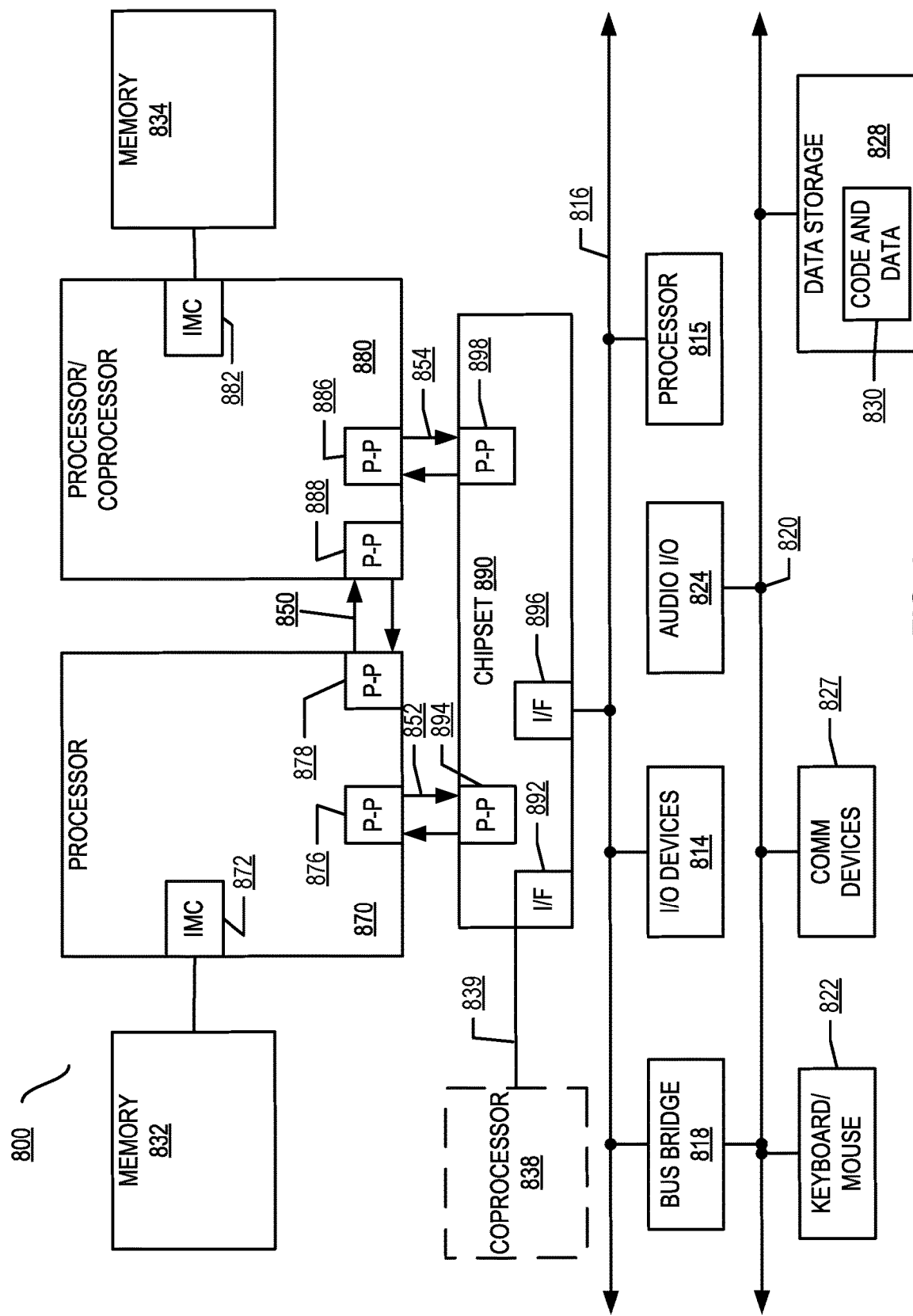
FIG. 8 shows a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
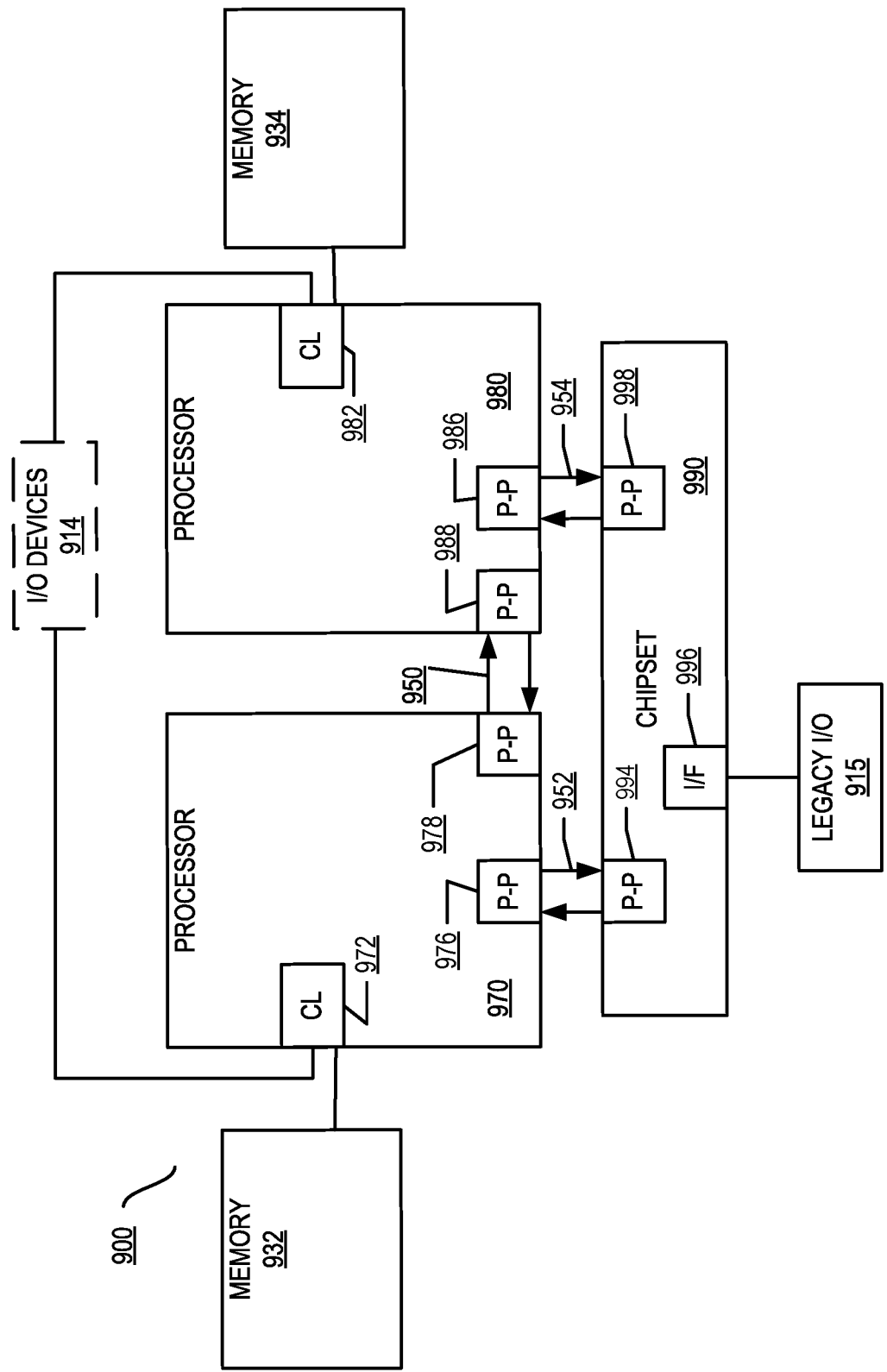
FIG. 9 shows a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 shows that the processors 970, 980 may include integrated memory and I/O control logic ("CL") 972 and 982, respectively. Thus, the CL 972, 982 include integrated memory controller units and include I/O control logic. FIG. 9 shows that not only are the memories 932, 934 coupled to the CL 972, 982, but also that I/O devices 914 are also coupled to the control logic 972, 982. Legacy I/O devices 915 are coupled to the chipset 990.

Figure 10:
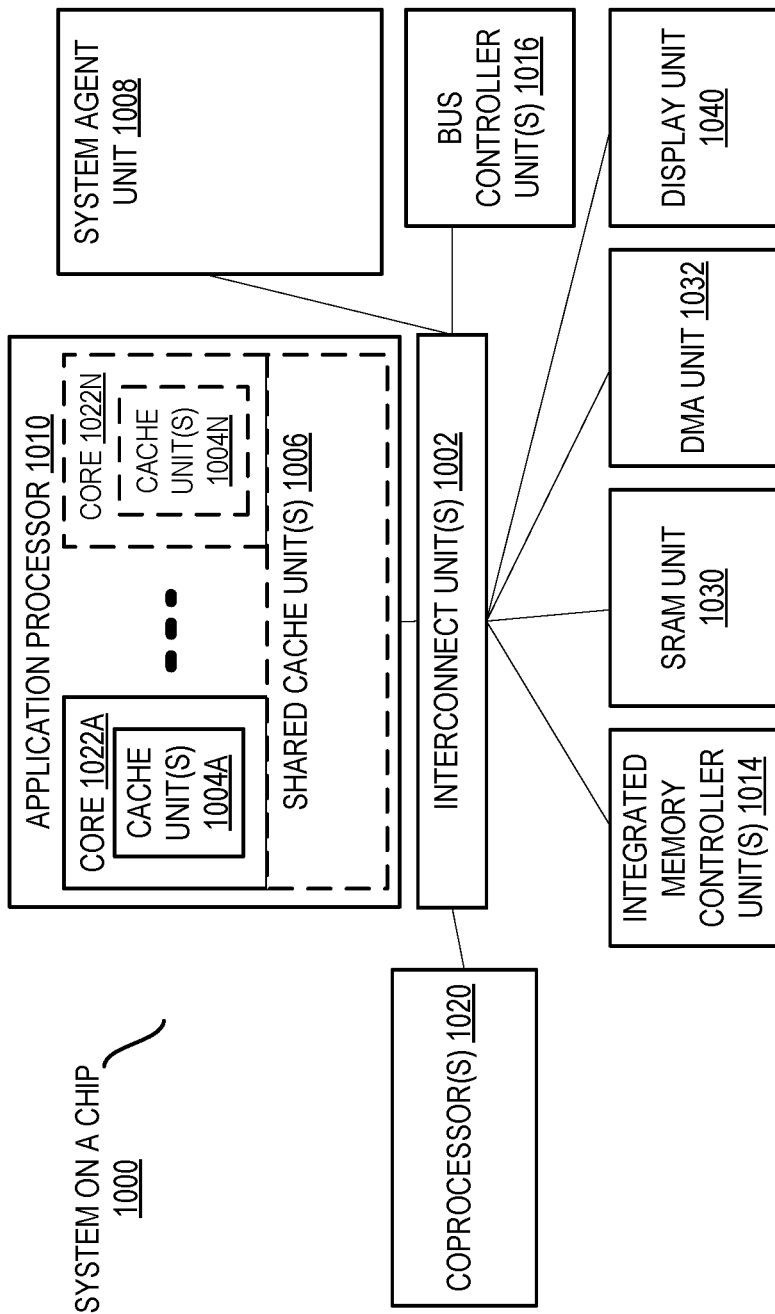
FIG. 10 shows a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 1022A-N and shared cache unit(s) 1006; a system agent unit 1008; a bus controller unit(s) 1016; an integrated memory controller unit(s) 1014; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 shown in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), digital video/versatile disc (DVD), Blu-ray (BD), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
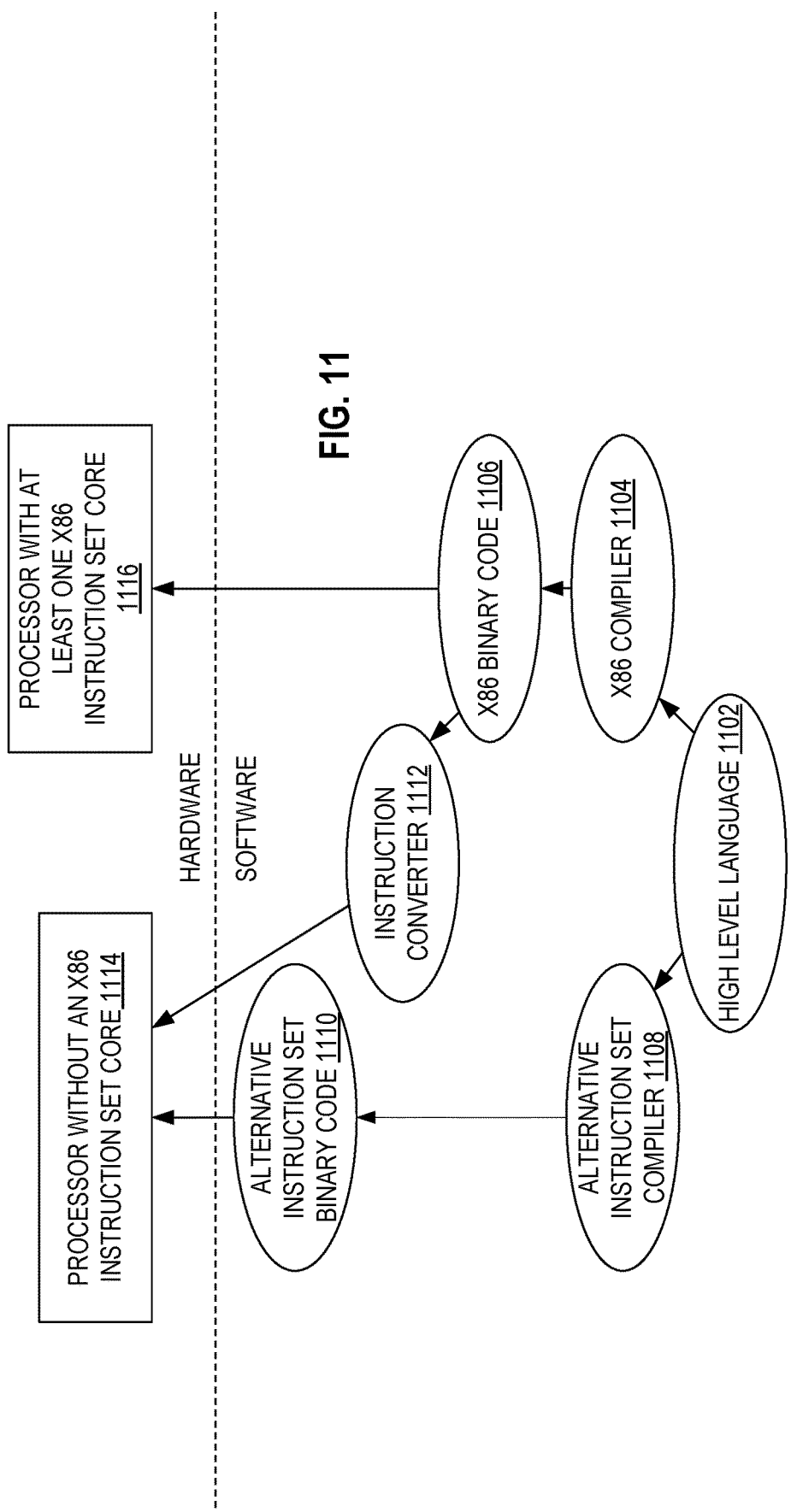
FIG. 11 shows a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high-level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high-level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Additional Computing Systems—Overview

Figure 12:
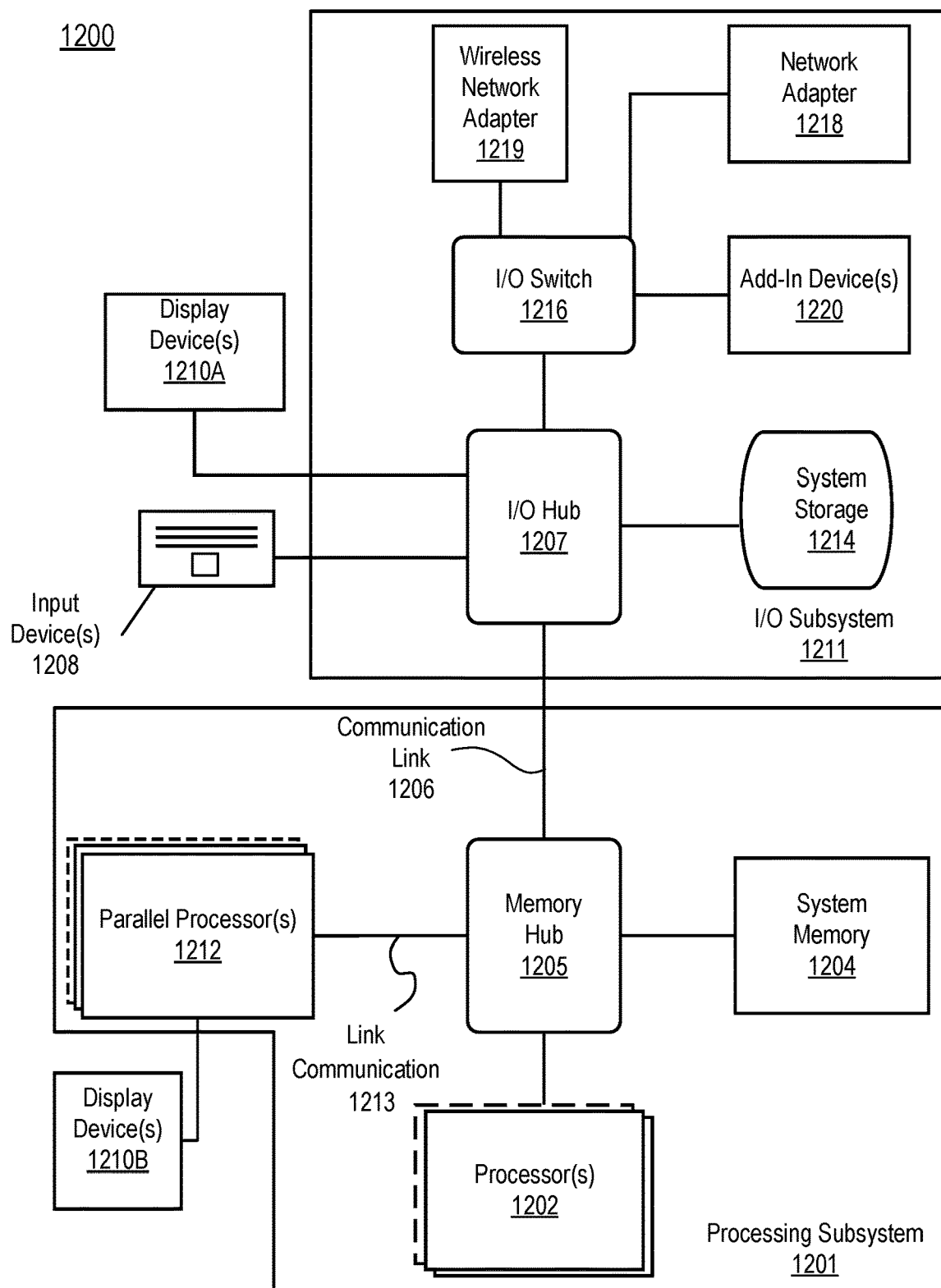
FIG. 12 is a block diagram illustrating a computer system configured to implement one or more aspects of the embodiments described herein.

FIG. 12 is a block diagram illustrating a computing system 1200 configured to implement one or more aspects of the embodiments described herein. The computing system 1200 includes a processing subsystem 1201 having one or more processor(s) 1202 and a system memory 1204 communicating via an interconnection path that may include a memory hub 1205. The memory hub 1205 may be a separate component within a chipset component or may be integrated within the one or more processor(s) 1202. The memory hub 1205 couples with an I/O subsystem 1211 via a communication link 1206. The I/O subsystem 1211 includes an I/O hub 1207 that can enable the computing system 1200 to receive input from one or more input device(s) 1208. Additionally, the I/O hub 1207 can enable a display controller, which may be included in the one or more processor(s) 1202, to provide outputs to one or more display device(s) 1210A. In one embodiment the one or more display device(s) 1210A coupled with the I/O hub 1207 can include a local, internal, or embedded display device.

In one embodiment the processing subsystem 1201 includes one or more parallel processor(s) 1212 coupled to memory hub 1205 via a bus or other communication link 1213. The communication link 1213 may be one of any number of standards-based communication link technologies or protocols, such as, but not limited to PCI Express, or may be a vendor specific communications interface or communications fabric. In one embodiment the one or more parallel processor(s) 1212 form a computationally focused parallel or vector processing system that an include a large number of processing cores and/or processing clusters, such as a many integrated core (MIC) processor. In one embodiment the one or more parallel processor(s) 1212 form a graphics processing subsystem that can output pixels to one of the one or more display device(s) 1210A coupled via the I/O Hub 1207. The one or more parallel processor(s) 1212 can also include a display controller and display interface (not shown) to enable a direct connection to one or more display device(s) 1210B.

Within the I/O subsystem 1211, a system storage unit 1214 can connect to the I/O hub 1207 to provide a storage mechanism for the computing system 1200. An I/O switch 1216 can be used to provide an interface mechanism to enable connections between the I/O hub 1207 and other components, such as a network adapter 1218 and/or wireless network adapter 1219 that may be integrated into the platform, and various other devices that can be added via one or more add-in device(s) 1220. The network adapter 1218 can be an Ethernet adapter or another wired network adapter. The wireless network adapter 1219 can include one or more of a Wi-Fi, Bluetooth, near field communication (NFC), or other network device that includes one or more wireless radios.

The computing system 1200 can include other components not explicitly shown, including USB or other port connections, optical storage drives, video capture devices, and the like, may also be connected to the I/O hub 1207. Communication paths interconnecting the various components in FIG. 12 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 1212 incorporate circuitry optimized for graphics and video processing, including, for example, video output circuitry, and constitutes a graphics processing unit (GPU). In another embodiment, the one or more parallel processor(s) 1212 incorporate circuitry optimized for general-purpose processing, while preserving the underlying computational architecture, described in greater detail herein. In yet another embodiment, components of the computing system 1200 may be integrated with one or more other system elements on a single integrated circuit. For example, the one or more parallel processor(s), 1212 memory hub 1205, processor(s) 1202, and I/O hub 1207 can be integrated into a system on chip (SoC) integrated circuit. Alternatively, the components of the computing system 1200 can be integrated into a single package to form a system in package (SIP) configuration. In one embodiment, at least a portion of the components of the computing system 1200 can be integrated into a multi-chip module (MCM), which can be interconnected with other multi-chip modules into a modular computing system.

It will be appreciated that the computing system 1200 shown herein is illustrative and that variations and modifications are possible. The connection topology, including the number and arrangement of bridges, the number of processor(s) 1202, and the number of parallel processor(s) 1212, may be modified as desired. For instance, in some embodiments, system memory 1204 is connected to the processor(s) 1202 directly rather than through a bridge, while other devices communicate with system memory 1204 via the memory hub 1205 and the processor(s) 1202. In other alternative topologies, the parallel processor(s) 1212 are connected to the I/O hub 1207 or directly to one of the one or more processor(s) 1202, rather than to the memory hub 1205. In other embodiments, the I/O hub 1207 and memory hub 1205 may be integrated into a single chip. Some embodiments may include two or more sets of processor(s) 1202 attached via multiple sockets, which can couple with two or more instances of the parallel processor(s) 1212.

Some of the particular components shown herein are optional and may not be included in all implementations of the computing system 1200. For example, any number of add-in cards or peripherals may be supported, or some components may be eliminated. Furthermore, some architectures may use different terminology for components similar to those illustrated in FIG. 12. For example, the memory hub 1205 may be referred to as a Northbridge in some architectures, while the I/O hub 1207 may be referred to as a Southbridge.

Figure 13A:
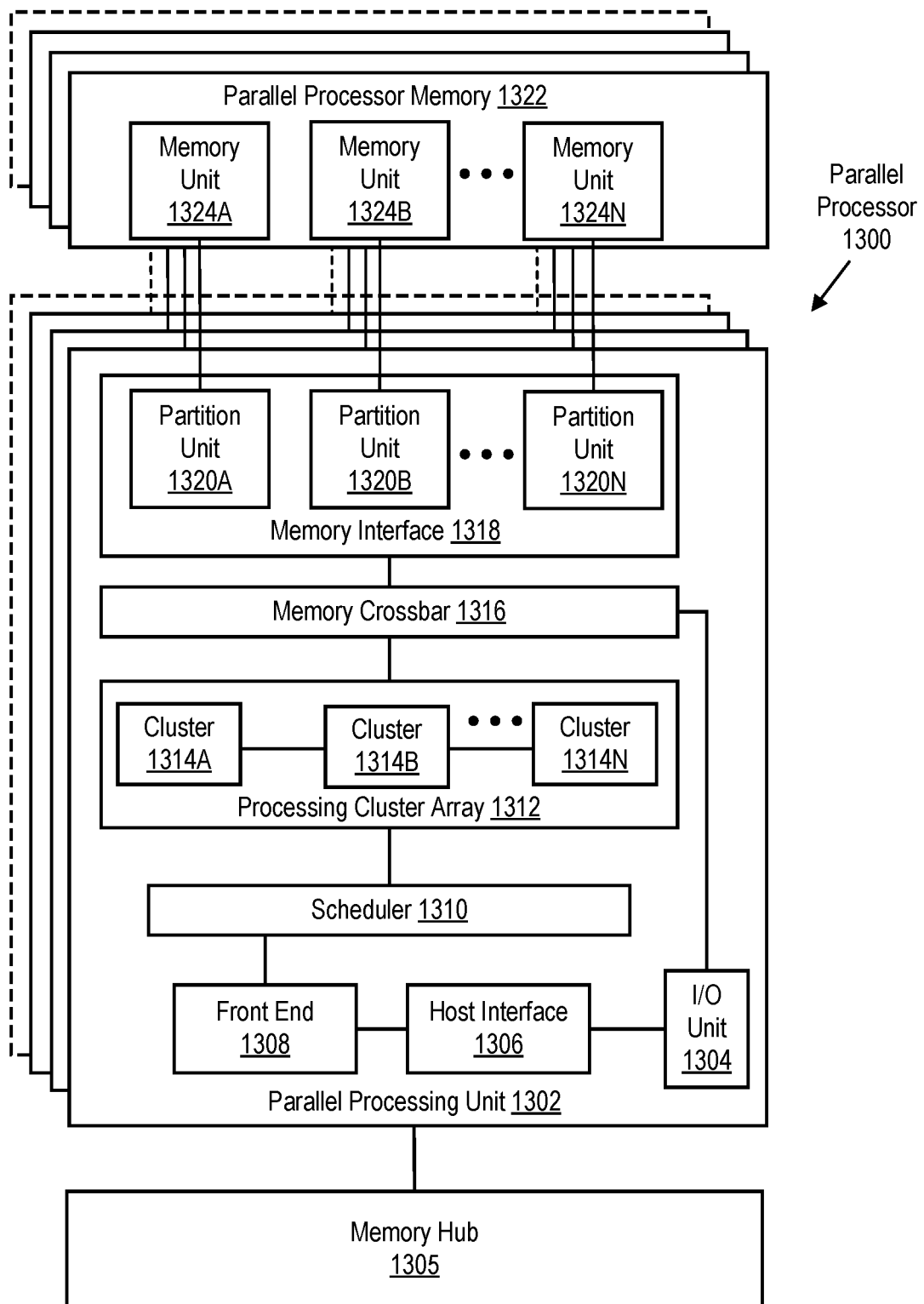
FIGS. 13A-13D illustrate parallel processor components, according to an embodiment.

FIG. 13A illustrates a parallel processor 1300, according to an embodiment. The various components of the parallel processor 1300 may be implemented using one or more integrated circuit devices, such as programmable processors, application specific integrated circuits (ASICs), or field programmable gate arrays (FPGA). The illustrated parallel processor 1300 is a variant of the one or more parallel processor(s) 1212 shown in FIG. 12, according to an embodiment.

In one embodiment the parallel processor 1300 includes a parallel processing unit 1302. The parallel processing unit includes an I/O unit 1304 that enables communication with other devices, including other instances of the parallel processing unit 1302. The I/O unit 1304 may be directly connected to other devices. In one embodiment the I/O unit 1304 connects with other devices via the use of a hub or switch interface, such as memory hub 13405. The connections between the memory hub 13405 and the I/O unit 1304 form a communication link 13413. Within the parallel processing unit 1302, the I/O unit 1304 connects with a host interface 1306 and a memory crossbar 1316, where the host interface 1306 receives commands directed to performing processing operations and the memory crossbar 1316 receives commands directed to performing memory operations.

When the host interface 1306 receives a command buffer via the I/O unit 1304, the host interface 1306 can direct work operations to perform those commands to a front end 1308. In one embodiment the front end 1308 couples with a scheduler 1310, which is configured to distribute commands or other work items to a processing cluster array 1312. In one embodiment the scheduler 1310 ensures that the processing cluster array 1312 is properly configured and in a valid state before tasks are distributed to the processing clusters of the processing cluster array 1312. In one embodiment the scheduler 1310 is implemented via firmware logic executing on a microcontroller. The microcontroller implemented scheduler 1310 is configurable to perform complex scheduling and work distribution operations at coarse and fine granularity, enabling rapid preemption and context switching of threads executing on the processing array 1312. In one embodiment, the host software can prove workloads for scheduling on the processing array 1312 via one of multiple graphics processing doorbells. The workloads can then be automatically distributed across the processing array 1312 by the scheduler 1310 logic within the scheduler microcontroller.

The processing cluster array 1312 can include up to "N" processing clusters (e.g., cluster 1314A, cluster 1314B, through cluster 1314N). Each cluster 1314A-1314N of the processing cluster array 1312 can execute a large number of concurrent threads. The scheduler 1310 can allocate work to the clusters 1314A-1314N of the processing cluster array 1312 using various scheduling and/or work distribution algorithms, which may vary depending on the workload arising for each type of program or computation. The scheduling can be handled dynamically by the scheduler 1310 or can be assisted in part by compiler logic during compilation of program logic configured for execution by the processing cluster array 1312. In one embodiment, different clusters 1314A-1314N of the processing cluster array 1312 can be allocated for processing different types of programs or for performing different types of computations.

The processing cluster array 1312 can be configured to perform various types of parallel processing operations. In one embodiment the processing cluster array 1312 is configured to perform general-purpose parallel compute operations. For example, the processing cluster array 1312 can include logic to execute processing tasks including filtering of video and/or audio data, performing modeling operations, including physics operations, and performing data transformations.

In one embodiment the processing cluster array 1312 is configured to perform parallel graphics processing operations. In embodiments in which the parallel processor 1300 is configured to perform graphics processing operations, the processing cluster array 1312 can include additional logic to support the execution of such graphics processing operations, including, but not limited to texture sampling logic to perform texture operations, as well as tessellation logic and other vertex processing logic. Additionally, the processing cluster array 1312 can be configured to execute graphics processing related shader programs such as, but not limited to vertex shaders, tessellation shaders, geometry shaders, and pixel shaders. The parallel processing unit 1302 can transfer data from system memory via the I/O unit 1304 for processing. During processing the transferred data can be stored to on-chip memory (e.g., parallel processor memory 1322) during processing, then written back to system memory.

In one embodiment, when the parallel processing unit 1302 is used to perform graphics processing, the scheduler 1310 can be configured to divide the processing workload into approximately equal sized tasks, to better enable distribution of the graphics processing operations to multiple clusters 1314A-1314N of the processing cluster array 1312. In some embodiments, portions of the processing cluster array 1312 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 1314A-1314N may be stored in buffers to allow the intermediate data to be transmitted between clusters 1314A-1314N for further processing.

During operation, the processing cluster array 1312 can receive processing tasks to be executed via the scheduler 1310, which receives commands defining processing tasks from front end 1308. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 1310 may be configured to fetch the indices corresponding to the tasks or may receive the indices from the front end 1308. The front end 1308 can be configured to ensure the processing cluster array 1312 is configured to a valid state before the workload specified by incoming command buffers (e.g., batch-buffers, push buffers, etc.) is initiated.

Each of the one or more instances of the parallel processing unit 1302 can couple with parallel processor memory 1322. The parallel processor memory 1322 can be accessed via the memory crossbar 1316, which can receive memory requests from the processing cluster array 1312 as well as the I/O unit 1304. The memory crossbar 1316 can access the parallel processor memory 1322 via a memory interface 1318. The memory interface 1318 can include multiple partition units (e.g., partition unit 1320A, partition unit 1320B, through partition unit 1320N) that can each couple to a portion (e.g., memory unit) of parallel processor memory 1322. In one implementation the number of partition units 1320A-1320N is configured to be equal to the number of memory units, such that a first partition unit 1320A has a corresponding first memory unit 1324A, a second partition unit 1320B has a corresponding memory unit 1324B, and an Nth partition unit 1320N has a corresponding Nth memory unit 1324N. In other embodiments, the number of partition units 1320A-1320N may not be equal to the number of memory devices.

In various embodiments, the memory units 1324A-1324N can include various types of memory devices, including dynamic random-access memory (DRAM) or graphics random access memory, such as synchronous graphics random access memory (SGRAM), including graphics double data rate (GDDR) memory. In one embodiment, the memory units 1324A-1324N may also include 3D stacked memory, including but not limited to high bandwidth memory (HBM). Persons skilled in the art will appreciate that the specific implementation of the memory units 1324A-1324N can vary and can be selected from one of various conventional designs. Render targets, such as frame buffers or texture maps may be stored across the memory units 1324A-1324N, allowing partition units 1320A-1320N to write portions of each render target in parallel to efficiently use the available bandwidth of parallel processor memory 1322. In some embodiments, a local instance of the parallel processor memory 1322 may be excluded in favor of a unified memory design that utilizes system memory in conjunction with local cache memory.

In one embodiment, any one of the clusters 1314A-1314N of the processing cluster array 1312 can process data that will be written to any of the memory units 1324A-1324N within parallel processor memory 1322. The memory crossbar 1316 can be configured to transfer the output of each cluster 1314A-1314N to any partition unit 1320A-1320N or to another cluster 1314A-1314N, which can perform additional processing operations on the output. Each cluster 1314A-1314N can communicate with the memory interface 1318 through the memory crossbar 1316 to read from or write to various external memory devices. In one embodiment the memory crossbar 1316 has a connection to the memory interface 1318 to communicate with the I/O unit 1304, as well as a connection to a local instance of the parallel processor memory 1322, enabling the processing units within the different processing clusters 1314A-1314N to communicate with system memory or other memory that is not local to the parallel processing unit 1302. In one embodiment the memory crossbar 1316 can use virtual channels to separate traffic streams between the clusters 1314A-1314N and the partition units 1320A-1320N.

While a single instance of the parallel processing unit 1302 is illustrated within the parallel processor 1300, any number of instances of the parallel processing unit 1302 can be included. For example, multiple instances of the parallel processing unit 1302 can be provided on a single add-in card, or multiple add-in cards can be interconnected. The different instances of the parallel processing unit 1302 can be configured to inter-operate even if the different instances have different numbers of processing cores, different amounts of local parallel processor memory, and/or other configuration differences. For example and in one embodiment, some instances of the parallel processing unit 1302 can include higher precision floating point units relative to other instances. Systems incorporating one or more instances of the parallel processing unit 1302 or the parallel processor 1300 can be implemented in a variety of configurations and form factors, including but not limited to desktop, laptop, or handheld personal computers, servers, workstations, game consoles, and/or embedded systems.

Figure 13B:
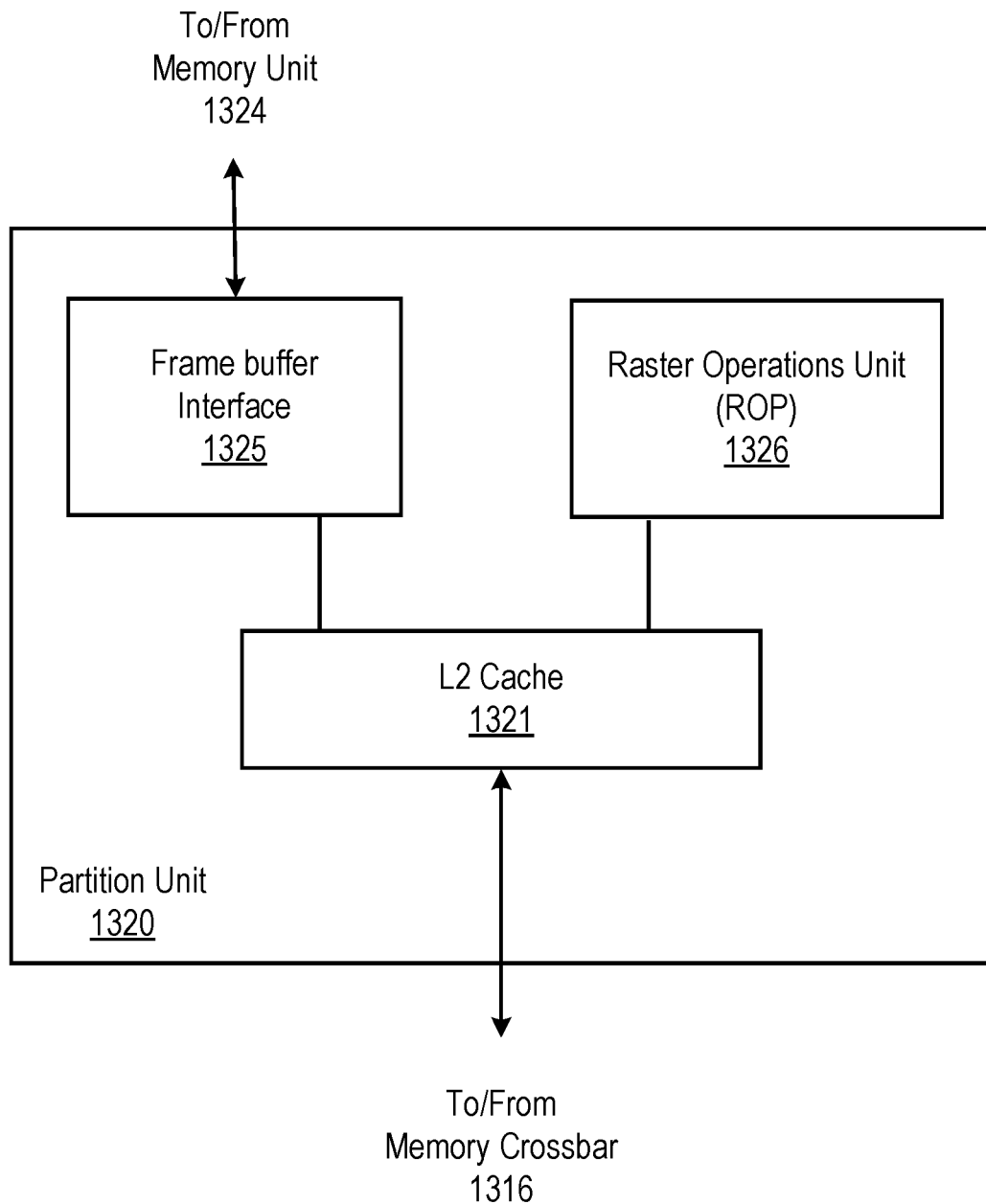

FIG. 13B is a block diagram of a partition unit 1320, according to an embodiment. In one embodiment the partition unit 1320 is an instance of one of the partition units 1320A-1320N of FIG. 13A. As illustrated, the partition unit 1320 includes an L2 cache 1321, a frame buffer interface 1325, and a ROP 1326 (raster operations unit). The L2 cache 1321 is a read/write cache that is configured to perform load and store operations received from the memory crossbar 1316 and ROP 1326. Read misses and urgent write-back requests are output by L2 cache 1321 to frame buffer interface 1325 for processing. Updates can also be sent to the frame buffer via the frame buffer interface 1325 for processing. In one embodiment the frame buffer interface 1325 interfaces with one of the memory units in parallel processor memory, such as the memory units 1324A-1324N of FIG. 13 (e.g., within parallel processor memory 1322).

In graphics applications, the ROP 1326 is a processing unit that performs raster operations such as stencil, z test, blending, and the like. The ROP 1326 then outputs processed graphics data that is stored in graphics memory. In some embodiments the ROP 1326 includes compression logic to compress depth or color data that is written to memory and decompress depth or color data that is read from memory. The compression logic can be lossless compression logic that makes use of one or more of multiple compression algorithms The type of compression that is performed by the ROP 1326 can vary based on the statistical characteristics of the data to be compressed. For example, in one embodiment, delta color compression is performed on depth and color data on a per-tile basis.

In some embodiments, the ROP 1326 is included within each processing cluster (e.g., cluster 1314A-1314N of FIG. 13) instead of within the partition unit 1320. In such embodiment, read and write requests for pixel data are transmitted over the memory crossbar 1316 instead of pixel fragment data. The processed graphics data may be displayed on a display device, such as one of the one or more display device(s) 1210 of FIG. 12, routed for further processing by the processor(s) 1202, or routed for further processing by one of the processing entities within the parallel processor 1300 of FIG. 13A.

Figure 13C:
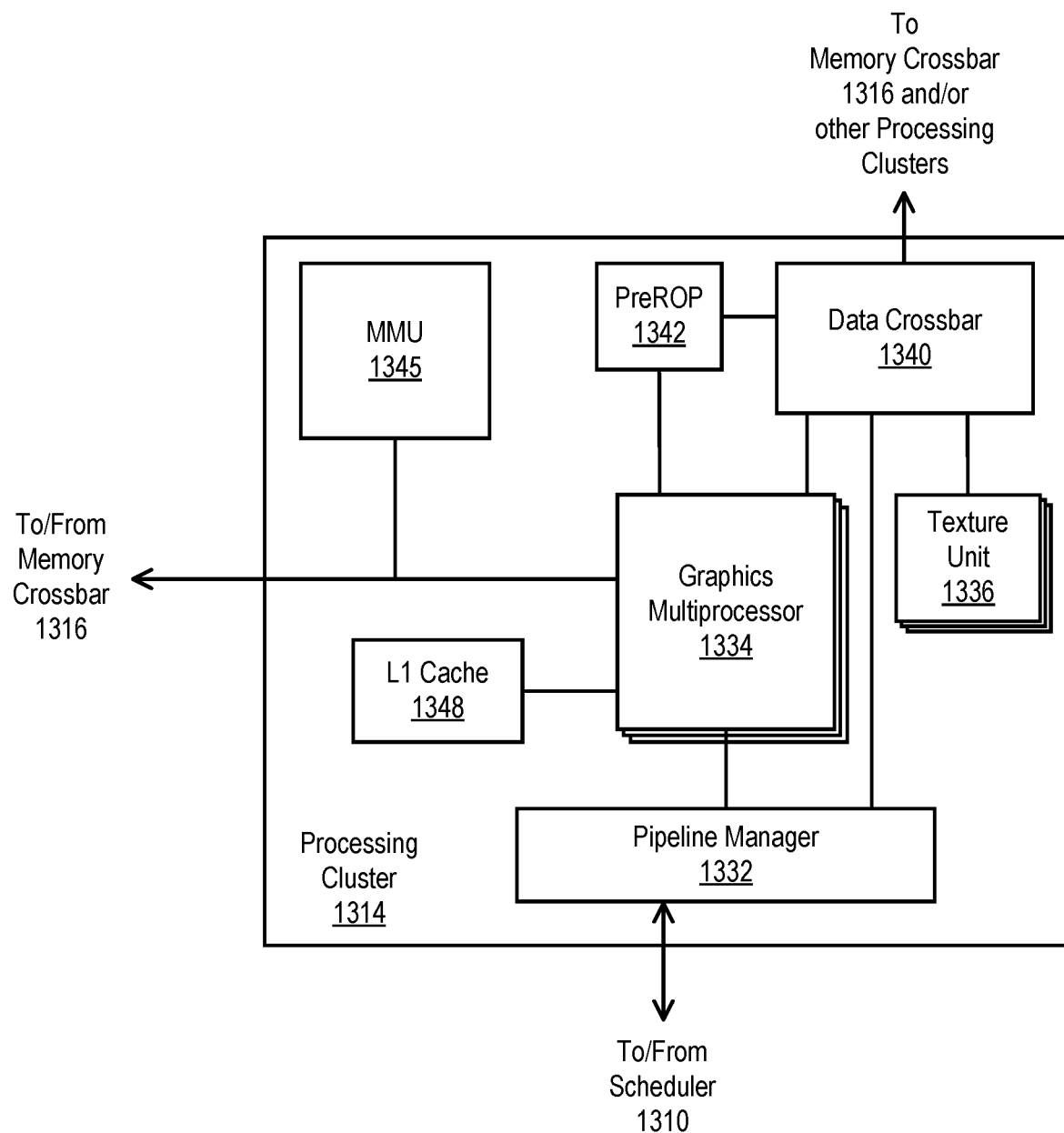

FIG. 13C is a block diagram of a processing cluster 1314 within a parallel processing unit, according to an embodiment. In one embodiment the processing cluster is an instance of one of the processing clusters 1314A-1314N of FIG. 13. The processing cluster 1314 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 1314 can be controlled via a pipeline manager 1332 that distributes processing tasks to SIMT parallel processors. The pipeline manager 1332 receives instructions from the scheduler 1310 of FIG. 13 and manages execution of those instructions via a graphics multiprocessor 1334 and/or a texture unit 1336. The illustrated graphics multiprocessor 1334 is an exemplary instance of a SIMT parallel processor. However, various types of SIMT parallel processors of differing architectures may be included within the processing cluster 1314. One or more instances of the graphics multiprocessor 1334 can be included within a processing cluster 1314. The graphics multiprocessor 1334 can process data and a data crossbar 1340 can be used to distribute the processed data to one of multiple possible destinations, including other shader units. The pipeline manager 1332 can facilitate the distribution of processed data by specifying destinations for processed data to be distributed vis the data crossbar 1340.

Each graphics multiprocessor 1334 within the processing cluster 1314 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 1314 constitutes a thread. A set of threads executing across the set of parallel processing engines is a thread group. A thread group executes the same program on different input data. Each thread within a thread group can be assigned to a different processing engine within a graphics multiprocessor 1334. A thread group may include fewer threads than the number of processing engines within the graphics multiprocessor 1334. When a thread group includes fewer threads than the number of processing engines, one or more of the processing engines may be idle during cycles in which that thread group is being processed. A thread group may also include more threads than the number of processing engines within the graphics multiprocessor 1334. When the thread group includes more threads than the number of processing engines within the graphics multiprocessor 1334, processing can be performed over consecutive clock cycles. In one embodiment multiple thread groups can be executed concurrently on a graphics multiprocessor 1334.

In one embodiment the graphics multiprocessor 1334 includes an internal cache memory to perform load and store operations. In one embodiment, the graphics multiprocessor 1334 can forego an internal cache and use a cache memory (e.g., L1 cache 308) within the processing cluster 1314. Each graphics multiprocessor 1334 also has access to L2 caches within the partition units (e.g., partition units 1320A-1320N of FIG. 13) that are shared among all processing clusters 1314 and may be used to transfer data between threads. The graphics multiprocessor 1334 may also access off-chip global memory, which can include one or more of local parallel processor memory and/or system memory. Any memory external to the parallel processing unit 1302 may be used as global memory. Embodiments in which the processing cluster 1314 includes multiple instances of the graphics multiprocessor 1334 can share common instructions and data, which may be stored in the L1 cache 308.

Each processing cluster 1314 may include an MMU 1345 (memory management unit) that is configured to map virtual addresses into physical addresses. In other embodiments, one or more instances of the MMU 1345 may reside within the memory interface 1318 of FIG. 13. The MMU 1345 includes a set of page table entries (PTEs) used to map a virtual address to a physical address of a tile (talk more about tiling) and optionally a cache line index. The MMU 1345 may include address translation lookaside buffers (TLB) or caches that may reside within the graphics multiprocessor 1334 or the L1 cache or processing cluster 1314. The physical address is processed to distribute surface data access locality to allow efficient request interleaving among partition units. The cache line index may be used to determine whether a request for a cache line is a hit or miss.

In graphics and computing applications, a processing cluster 1314 may be configured such that each graphics multiprocessor 1334 is coupled to a texture unit 1336 for performing texture mapping operations, e.g., determining texture sample positions, reading texture data, and filtering the texture data. Texture data is read from an internal texture L1 cache (not shown) or in some embodiments from the L1 cache within graphics multiprocessor 1334 and is fetched from an L2 cache, local parallel processor memory, or system memory, as needed. Each graphics multiprocessor 1334 outputs processed tasks to the data crossbar 1340 to provide the processed task to another processing cluster 1314 for further processing or to store the processed task in an L2 cache, local parallel processor memory, or system memory via the memory crossbar 1316. A preROP 1342 (pre-raster operations unit) is configured to receive data from graphics multiprocessor 1334, direct data to ROP units, which may be located with partition units as described herein (e.g., partition units 1320A-1320N of FIG. 13). The preROP 1342 unit can perform optimizations for color blending, organize pixel color data, and perform address translations.

It will be appreciated that the core architecture described herein is illustrative and that variations and modifications are possible. Any number of processing units, e.g., graphics multiprocessor 1334, texture units 1336, preROPs 1342, etc., may be included within a processing cluster 1314. Further, while only one processing cluster 1314 is shown, a parallel processing unit as described herein may include any number of instances of the processing cluster 1314. In one embodiment, each processing cluster 1314 can be configured to operate independently of other processing clusters 1314 using separate and distinct processing units, L1 caches, etc.

Figure 13D:
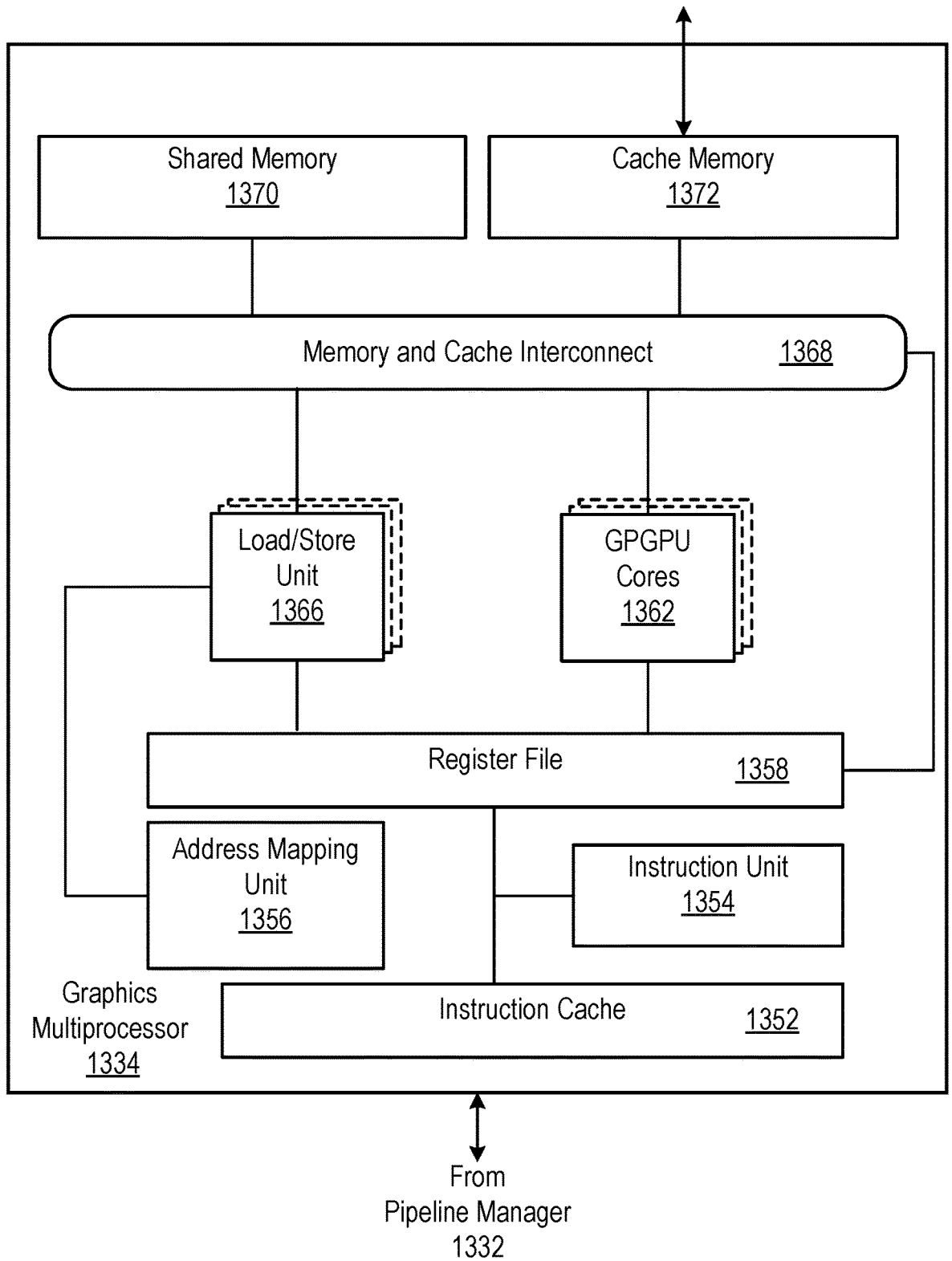

FIG. 13D shows a graphics multiprocessor 1334, according to one embodiment. In such embodiment the graphics multiprocessor 1334 couples with the pipeline manager 1332 of the processing cluster 1314. The graphics multiprocessor 1334 has an execution pipeline including but not limited to an instruction cache 1352, an instruction unit 1354, an address mapping unit 1356, a register file 1358, one or more general-purpose graphics processing unit (GPGPU) cores 1362, and one or more load/store units 1366. The GPGPU cores 1362 and load/store units 1366 are coupled with cache memory 1372 and shared memory 1370 via a memory and cache interconnect 1368.

In one embodiment, the instruction cache 1352 receives a stream of instructions to execute from the pipeline manager 1332. The instructions are cached in the instruction cache 1352 and dispatched for execution by the instruction unit 1354. The instruction unit 1354 can dispatch instructions as thread groups (e.g., warps), with each thread of the thread group assigned to a different execution unit within GPGPU core 1362. An instruction can access any of a local, shared, or global address space by specifying an address within a unified address space. The address mapping unit 1356 can be used to translate addresses in the unified address space into a distinct memory address that can be accessed by the load/store units 1366.

The register file 1358 provides a set of registers for the functional units of the graphics multiprocessor 1334. The register file 1358 provides temporary storage for operands connected to the data paths of the functional units (e.g., GPGPU cores 1362, load/store units 1366) of the graphics multiprocessor 1334. In one embodiment, the register file 1358 is divided between each of the functional units such that each functional unit is allocated a dedicated portion of the register file 1358. In one embodiment, the register file 1358 is divided between the different warps being executed by the graphics multiprocessor 1334.

The GPGPU cores 1362 can each include floating point units (FPUs) and/or integer arithmetic logic units (ALUs) that are used to execute instructions of the graphics multiprocessor 1334. The GPGPU cores 1362 can be similar in architecture or can differ in architecture, according to embodiments. For example and in one embodiment, a first portion of the GPGPU cores 1362 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 1334 can additionally include one or more fixed function or special function units to perform specific functions such as copy rectangle or pixel blending operations. In one embodiment one or more of the GPGPU cores can also include fixed or special function logic.

In one embodiment the GPGPU cores 1362 include SIMD logic capable of performing a single instruction on multiple sets of data. In one embodiment GPGPU cores 1362 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can executed via a single SIMD instruction. For example and in one embodiment, eight SIMT threads that perform the same or similar operations can be executed in parallel via a single SIMD8 logic unit.

The memory and cache interconnect 1368 is an interconnect network that connects each of the functional units of the graphics multiprocessor 1334 to the register file 1358 and to the shared memory 1370. In one embodiment, the memory and cache interconnect 1368 is a crossbar interconnect that allows the load/store unit 1366 to implement load and store operations between the shared memory 1370 and the register file 1358. The register file 1358 can operate at the same frequency as the GPGPU cores 1362, thus data transfer between the GPGPU cores 1362 and the register file 1358 is very low latency. The shared memory 1370 can be used to enable communication between threads that execute on the functional units within the graphics multiprocessor 1334. The cache memory 1372 can be used as a data cache for example, to cache texture data communicated between the functional units and the texture unit 1336. The shared memory 1370 can also be used as a program managed cached. Threads executing on the GPGPU cores 1362 can programmatically store data within the shared memory in addition to the automatically cached data that is stored within the cache memory 1372.

Figure 14A:
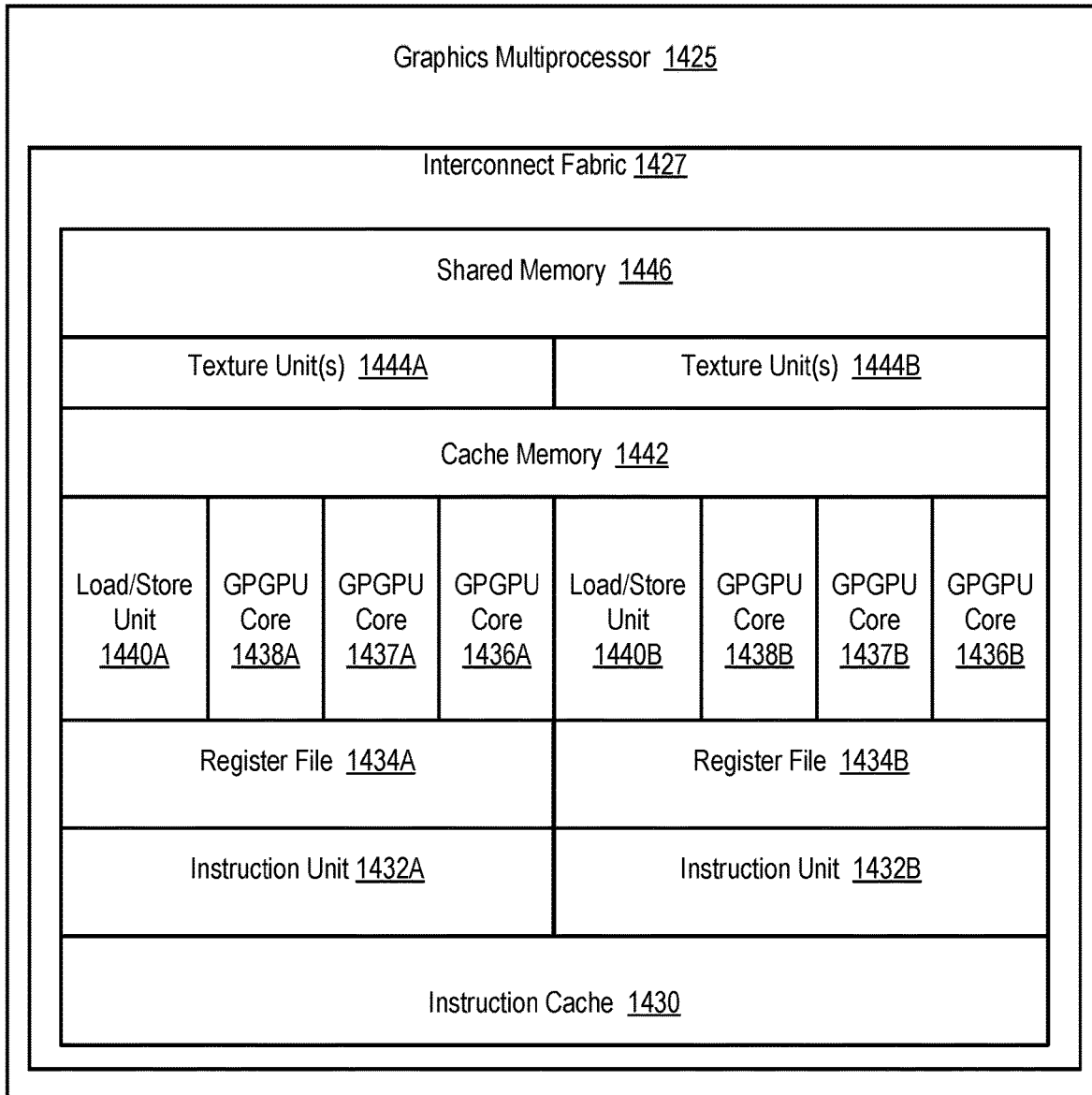
FIGS. 14A-14B are block diagrams of graphics multiprocessors, according to embodiments.
Figure 14B:
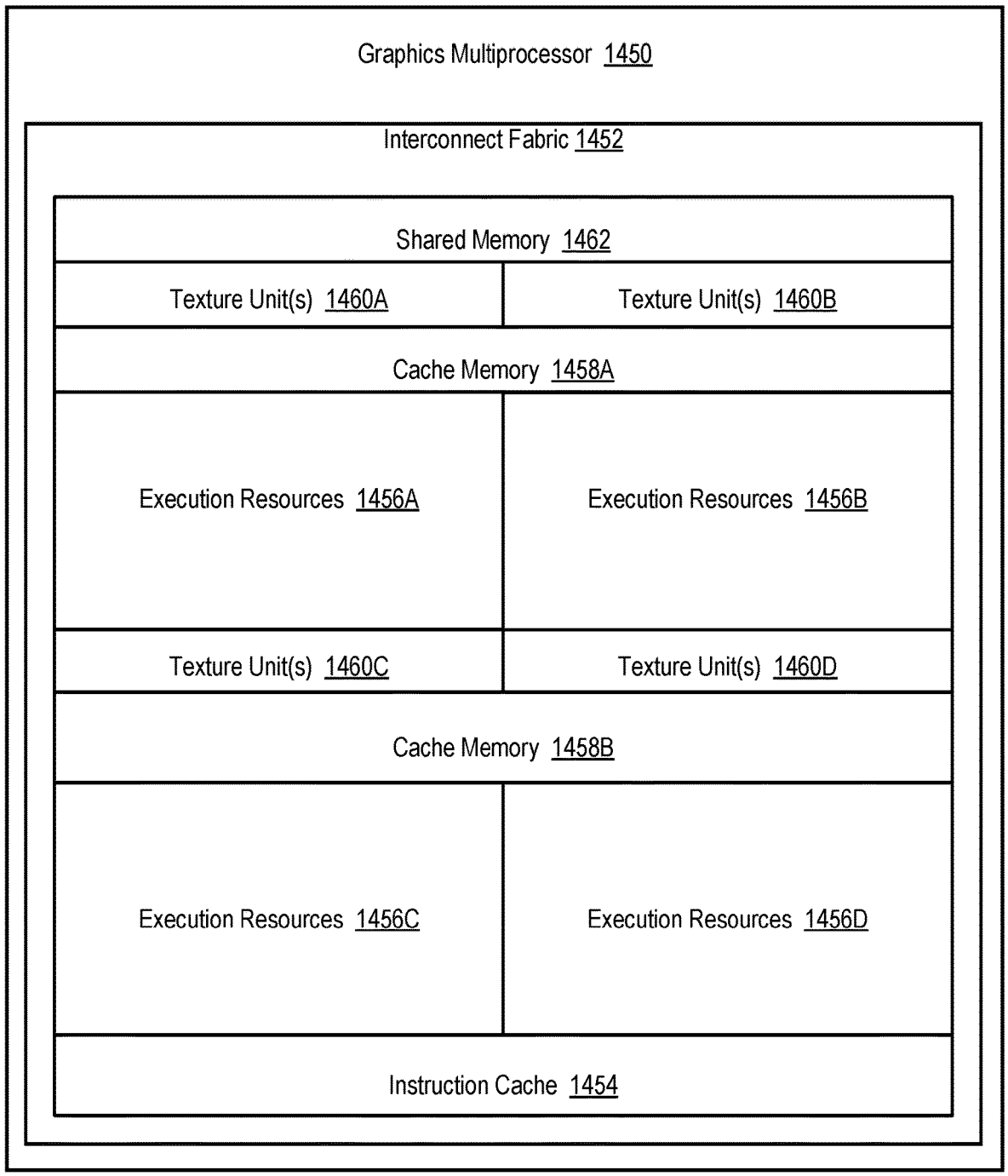

FIGS. 14A-14B illustrate additional graphics multiprocessors, according to embodiments. The illustrated graphics multiprocessors 1425, 1450 are variants of the graphics multiprocessor 1334 of FIG. 13C. The illustrated graphics multiprocessors 1425, 1450 can be configured as a streaming multiprocessor (SM) capable of simultaneous execution of a large number of execution threads.

FIG. 14A shows a graphics multiprocessor 1425 according to an additional embodiment. The graphics multiprocessor 1425 includes multiple additional instances of execution resource units relative to the graphics multiprocessor 234 of FIG. 13D. For example, the graphics multiprocessor 1425 can include multiple instances of the instruction unit 1432A-1432B, register file 1434A-1434B, and texture unit(s) 1444A-1444B. The graphics multiprocessor 1425 also includes multiple sets of graphics or compute execution units (e.g., GPGPU core 1436A-1436B, GPGPU core 1437A-1437B, GPGPU core 1438A-1438B) and multiple sets of load/store units 1440A-1440B. In one embodiment the execution resource units have a common instruction cache 1430, texture and/or data cache memory 1442, and shared memory 1446.

The various components can communicate via an interconnect fabric 1427. In one embodiment the interconnect fabric 1427 includes one or more crossbar switches to enable communication between the various components of the graphics multiprocessor 1425. In one embodiment the interconnect fabric 1427 is a separate, high-speed network fabric layer upon which each component of the graphics multiprocessor 1425 is stacked. The components of the graphics multiprocessor 1425 communicate with remote components via the interconnect fabric 1427. For example, the GPGPU cores 1436A-1436B, 1437A-1437B, and 1478A-1438B can each communicate with shared memory 1446 via the interconnect fabric 1427. The interconnect fabric 1427 can arbitrate communication within the graphics multiprocessor 1425 to ensure a fair bandwidth allocation between components.

FIG. 14B shows a graphics multiprocessor 1450 according to an additional embodiment. The graphics processor includes multiple sets of execution resources 1456A-1456D, where each set of execution resource includes multiple instruction units, register files, GPGPU cores, and load store units, as illustrated in FIG. 13D and FIG. 14A. The execution resources 1456A-1456D can work in concert with texture unit(s) 1460A-1460D for texture operations, while sharing an instruction cache 1454, and shared memory 1462. In one embodiment the execution resources 1456A-1456D can share an instruction cache 1454 and shared memory 1462, as well as multiple instances of a texture and/or data cache memory 1458A-1458B. The various components can communicate via an interconnect fabric 1452 similar to the interconnect fabric 1427 of FIG. 14A.

Persons skilled in the art will understand that the architecture described in FIGS. 12, 13A-13D, and 14A-14B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 1302 of FIG. 13, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general-purpose GPU (GPGPU) functions. The GPU may be communicatively coupled to the host processor/cores over a bus or other interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 15A:
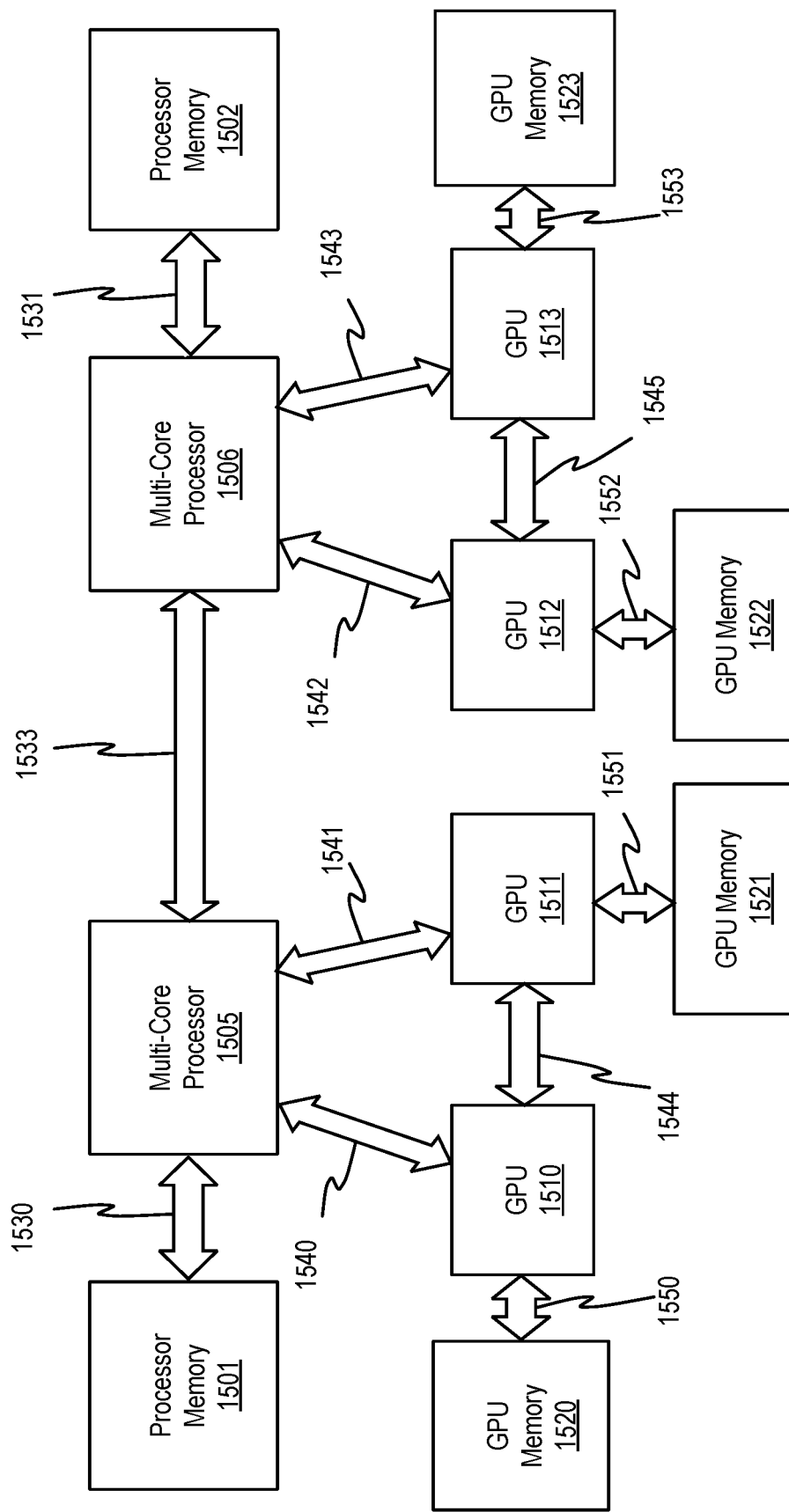
FIGS. 15A-15F illustrate an exemplary architecture in which a plurality of GPUs are communicatively coupled to a plurality of multi-core processors.

FIG. 15A illustrates an exemplary architecture in which a plurality of GPUs 1510-1513 are communicatively coupled to a plurality of multi-core processors 1505-1506 over high-speed links 1540-1543 (e.g., buses, point-to-point interconnects, etc.). In one embodiment, the high-speed links 1540-1543 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 1510-1513 are interconnected over high-speed links 1544-1545, which may be implemented using the same or different protocols/links than those used for high-speed links 1540-1543. Similarly, two or more of the multi-core processors 1505-1506 may be connected over high speed link 1533 which may be symmetric multi-processor (SMP) buses operating at 20 GB/s, 30 GB/s, 120 GB/s or higher. Alternatively, all communication between the various system components shown in FIG. 15A may be accomplished using the same protocols/links (e.g., over a common interconnection fabric). As mentioned, however, the underlying principles of the invention are not limited to any particular type of interconnect technology.

In one embodiment, each multi-core processor 1505-1506 is communicatively coupled to a processor memory 1501-1502, via memory interconnects 1530-1531, respectively, and each GPU 1510-1513 is communicatively coupled to GPU memory 1520-1523 over GPU memory interconnects 1550-1553, respectively. The memory interconnects 1530-1531 and 1550-1553 may utilize the same or different memory access technologies. By way of example, and not limitation, the processor memories 1501-1502 and GPU memories 1520-1523 may be volatile memories such as dynamic random-access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 1505-1506 and GPUs 1510-1513 may be physically coupled to a particular memory 1501-1502, 1520-1523, respectively, a unified memory architecture may be implemented in which the same virtual system address space (also referred to as the "effective address" space) is distributed among all of the various physical memories. For example, processor memories 1501-1502 may each comprise 64 GB of the system memory address space and GPU memories 1520-1523 may each comprise 32 GB of the system memory address space (resulting in a total of 256 GB addressable memory in this example).

Figure 15B:
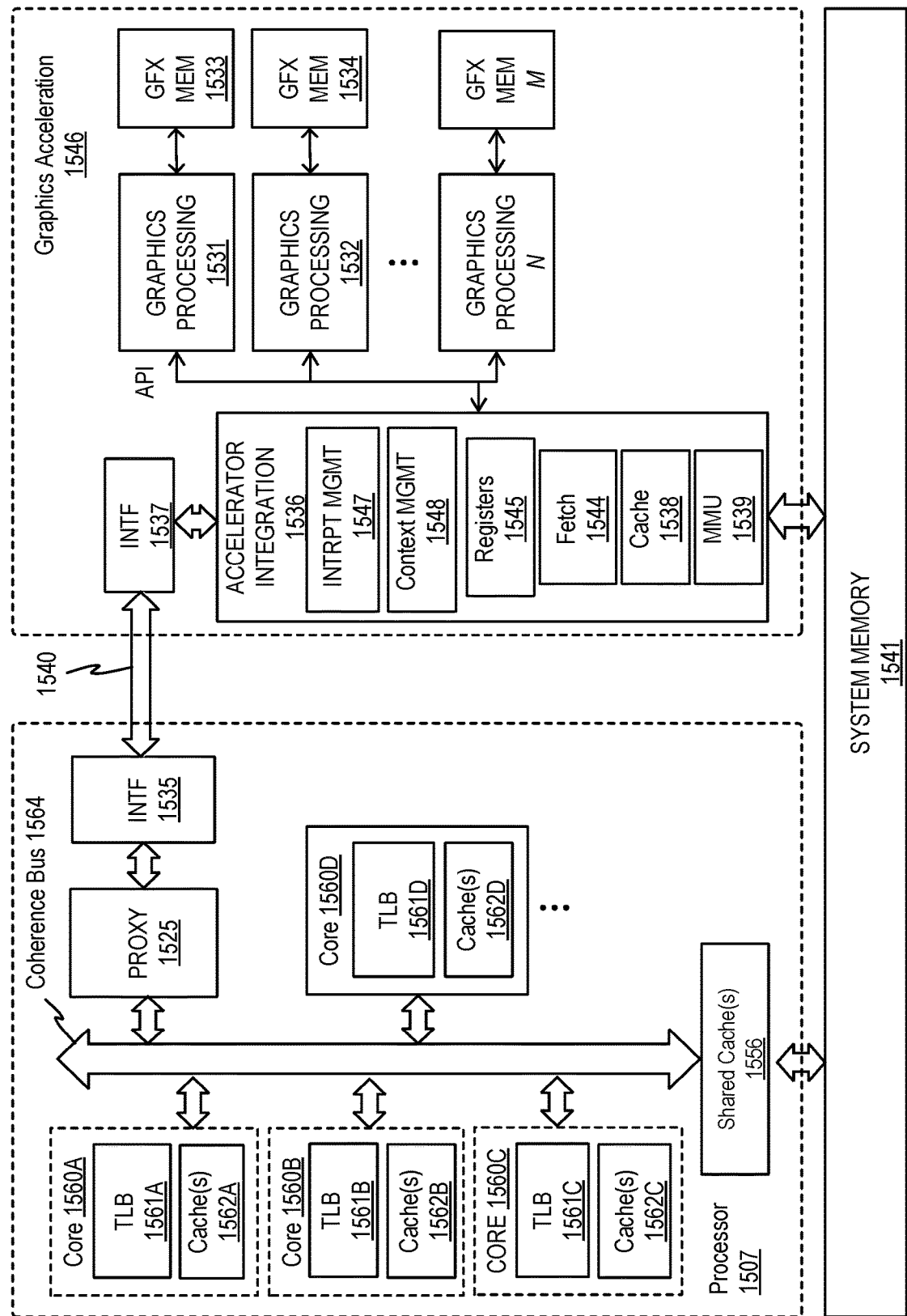

FIG. 15B illustrates additional details for an interconnection between a multi-core processor 1507 and a graphics acceleration module 1546 in accordance with one embodiment. The graphics acceleration module 1546 may include one or more GPU chips integrated on a line card which is coupled to the processor 1507 via the high-speed link 1540. Alternatively, the graphics acceleration module 1546 may be integrated on the same package or chip as the processor 1507.

The illustrated processor 1507 includes a plurality of cores 1560A-1560D, each with a translation lookaside buffer 1561A-1561D and one or more caches 1562A-1562D. The cores may include various other components for executing instructions and processing data which are not illustrated to avoid obscuring the underlying principles of the invention (e.g., instruction fetch units, branch prediction units, decoders, execution units, reorder buffers, etc.). The caches 1562A-1562D may comprise level 1 (L1) and level 2 (L2) caches. In addition, one or more shared caches 1526 may be included in the caching hierarchy and shared by sets of the cores 1560A-1560D. For example, one embodiment of the processor 1507 includes 24 cores, each with its own L1 cache, twelve shared L2 caches, and twelve shared L3 caches. In this embodiment, one of the L2 and L3 caches are shared by two adjacent cores. The processor 1507 and the graphics acceleration module 1546 connect with system memory 1541, which may include processor memories 1501-1502.

Coherency is maintained for data and instructions stored in the various caches 1562A-1562D, 1556 and system memory 1541 via inter-core communication over a coherence bus 1564. For example, each cache may have cache coherency logic/circuitry associated therewith to communicate to over the coherence bus 1564 in response to detected reads or writes to particular cache lines. In one implementation, a cache snooping protocol is implemented over the coherence bus 1564 to snoop cache accesses. Cache snooping/coherency techniques are well understood by those of skill in the art and will not be described in detail here to avoid obscuring the underlying principles of the invention.

In one embodiment, a proxy circuit 1525 communicatively couples the graphics acceleration module 1546 to the coherence bus 1564, allowing the graphics acceleration module 1546 to participate in the cache coherence protocol as a peer of the cores. In particular, an interface 1535 provides connectivity to the proxy circuit 1525 over high-speed link 1540 (e.g., a PCIe bus, NVLink, etc.) and an interface 1537 connects the graphics acceleration module 1546 to the link 1540.

In one implementation, an accelerator integration circuit 1536 provides cache management, memory access, context management, and interrupt management services on behalf of a plurality of graphics processing engines 1531, 1532, N of the graphics acceleration module 1546. The graphics processing engines 1531, 1532, N may each comprise a separate graphics processing unit (GPU). Alternatively, the graphics processing engines 1531, 1532, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 1531-1532, N or the graphics processing engines 1531-1532, N may be individual GPUs integrated on a common package, line card, or chip.

In one embodiment, the accelerator integration circuit 1536 includes a memory management unit (MMU) 1539 for performing various memory management functions such as virtual-to-physical memory translations (also referred to as effective-to-real memory translations) and memory access protocols for accessing system memory 1541. The MMU 1539 may also include a translation lookaside buffer (TLB) (not shown) for caching the virtual/effective to physical/real address translations. In one implementation, a cache 1538 stores commands and data for efficient access by the graphics processing engines 1531-1532, N. In one embodiment, the data stored in cache 1538 and graphics memories 1533-1534, N is kept coherent with the core caches 1562A-1562D, 1556 and system memory 1511. As mentioned, this may be accomplished via proxy circuit 1525 which takes part in the cache coherency mechanism on behalf of cache 1538 and memories 1533-1534, N (e.g., sending updates to the cache 1538 related to modifications/accesses of cache lines on processor caches 1562A-1562D, 1556 and receiving updates from the cache 1538).

A set of registers 1545 store context data for threads executed by the graphics processing engines 1531-1532, N and a context management circuit 1548 manages the thread contexts. For example, the context management circuit 1548 may perform save and restore operations to save and restore contexts of the various threads during contexts switches (e.g., where a first thread is saved and a second thread is stored so that the second thread can be execute by a graphics processing engine). For example, on a context switch, the context management circuit 1548 may store current register values to a designated region in memory (e.g., identified by a context pointer). It may then restore the register values when returning to the context. In one embodiment, an interrupt management circuit 1547 receives and processes interrupts received from system devices.

In one implementation, virtual/effective addresses from a graphics processing engine 1531 are translated to real/physical addresses in system memory 1511 by the MMU 1539. One embodiment of the accelerator integration circuit 1536 supports multiple (e.g., 4, 8, 16) graphics acceleration modules 1546 and/or other accelerator devices. The graphics acceleration module 1546 may be dedicated to a single application executed on the processor 1507 or may be shared between multiple applications. In one embodiment, a virtualized graphics execution environment is presented in which the resources of the graphics processing engines 1531-1532, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 1546 and provides address translation and system memory cache services. In addition, the accelerator integration circuit 1536 may provide virtualization facilities for the host processor to manage virtualization of the graphics processing engines, interrupts, and memory management.

Because hardware resources of the graphics processing engines 1531-1532, N are mapped explicitly to the real address space seen by the host processor 1507, any host processor can address these resources directly using an effective address value. One function of the accelerator integration circuit 1536, in one embodiment, is the physical separation of the graphics processing engines 1531-1532, N so that they appear to the system as independent units.

As mentioned, in the illustrated embodiment, one or more graphics memories 1533-1534, M are coupled to each of the graphics processing engines 1531-1532, N, respectively. The graphics memories 1533-1534, M store instructions and data being processed by each of the graphics processing engines 1531-1532, N. The graphics memories 1533-1534, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1540, biasing techniques are used to ensure that the data stored in graphics memories 1533-1534, M is data which will be used most frequently by the graphics processing engines 1531-1532, N and preferably not used by the cores 1560A-1560D (at least not frequently). Similarly, the biasing mechanism attempts to keep data needed by the cores (and preferably not the graphics processing engines 1531-1532, N) within the caches 1562A-1562D, 1556 of the cores and system memory 1511.

Figure 15C:
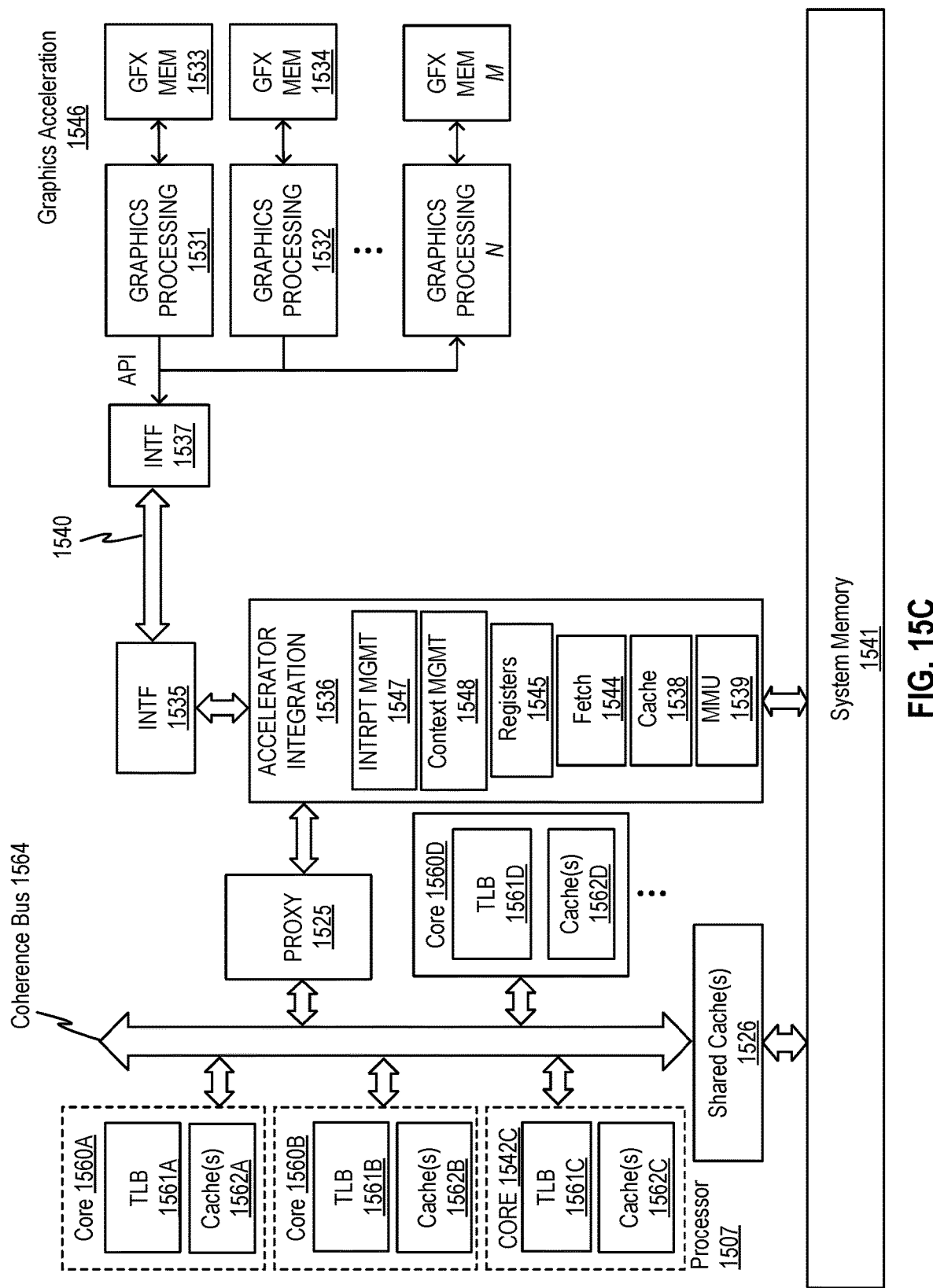

FIG. 15C illustrates another embodiment in which the accelerator integration circuit 1536 is integrated within the processor 1507. In this embodiment, the graphics processing engines 1531-1532, N communicate directly over the high-speed link 1540 to the accelerator integration circuit 1536 via interface 1537 and interface 1535 (which, again, may be utilize any form of bus or interface protocol). The accelerator integration circuit 1536 may perform the same operations as those described with respect to FIG. 15B, but potentially at a higher throughput given its close proximity to the coherency bus 1562 and caches 1562A-1562D, 1526.

One embodiment supports different programming models including a dedicated-process programming model (no graphics acceleration module virtualization) and shared programming models (with virtualization). The latter may include programming models which are controlled by the accelerator integration circuit 1536 and programming models which are controlled by the graphics acceleration module 1546.

In one embodiment of the dedicated process model, graphics processing engines 1531-1532, N are dedicated to a single application or process under a single operating system. The single application can funnel other application requests to the graphics processing engines 1531-1532, N, providing virtualization within a VM/partition.

In the dedicated-process programming models, the graphics processing engines 1531-1532, N, may be shared by multiple VM/application partitions. The shared models require a system hypervisor to virtualize the graphics processing engines 1531-1532, N to allow access by each operating system. For single-partition systems without a hypervisor, the graphics processing engines 1531-1532, N are owned by the operating system. In both cases, the operating system can virtualize the graphics processing engines 1531-1532, N to provide access to each process or application.

For the shared programming model, the graphics acceleration module 1546 or an individual graphics processing engine 1531-1532, N selects a process element using a process handle. In one embodiment, process elements are stored in system memory 1511 and are addressable using the effective address to real address translation techniques described herein. The process handle may be an implementation-specific value provided to the host process when registering its context with the graphics processing engine 1531-1532, N (that is, calling system software to add the process element to the process element linked list). The lower 16-bits of the process handle may be the offset of the process element within the process element linked list.

Figure 15D:
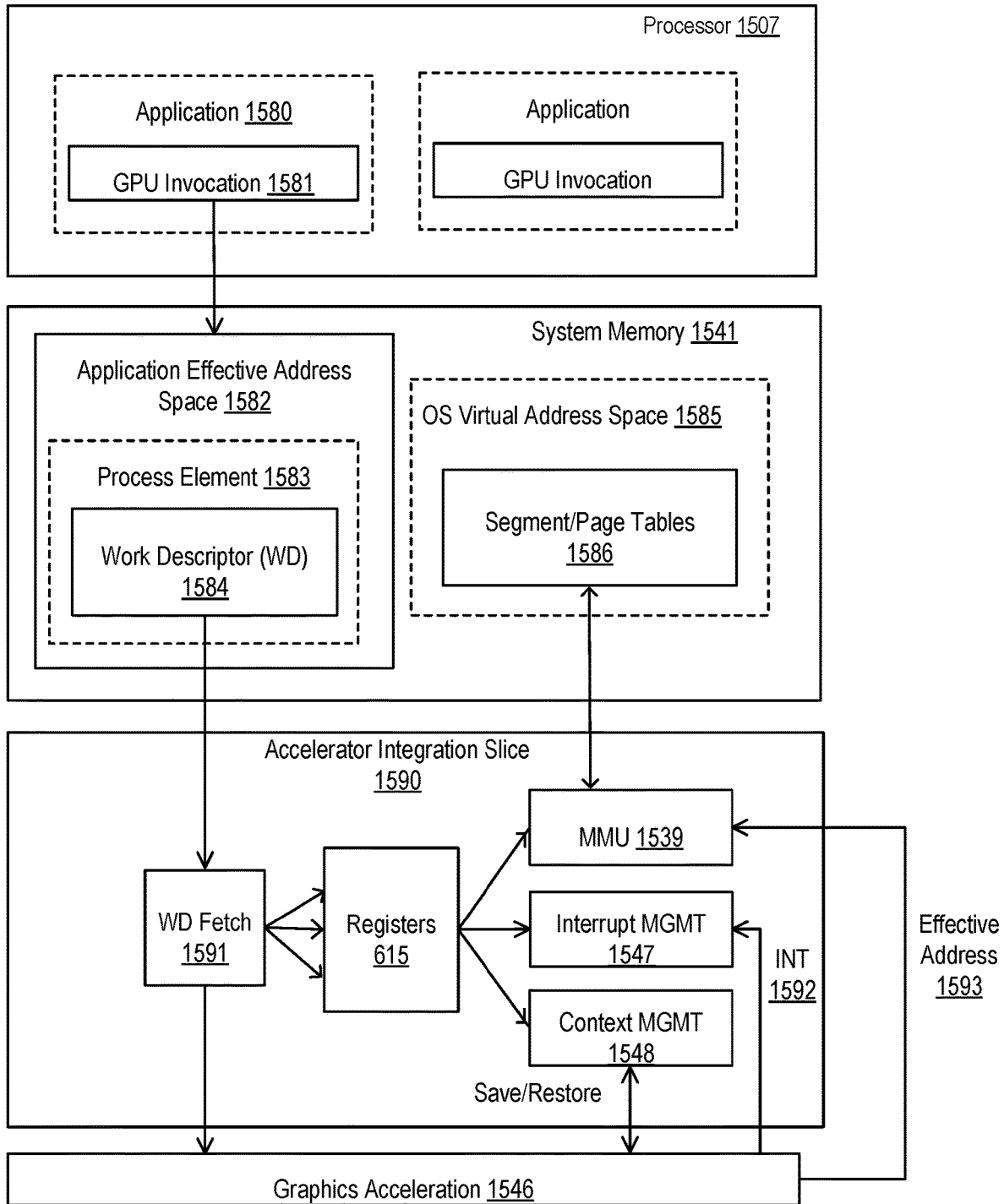

FIG. 15D illustrates an exemplary accelerator integration slice 1590. As used herein, a "slice" comprises a specified portion of the processing resources of the accelerator integration circuit 1536. Application effective address space 1582 within system memory 1511 stores process elements 1583. In one embodiment, the process elements 1583 are stored in response to GPU invocations 1581 from applications 1580 executed on the processor 1507. A process element 1583 contains the process state for the corresponding application 1580. A work descriptor (WD) 1584 contained in the process element 1583 can be a single job requested by an application or may contain a pointer to a queue of jobs. In the latter case, the WD 1584 is a pointer to the job request queue in the application's address space 1582.

The graphics acceleration module 1546 and/or the individual graphics processing engines 1531-1532, N can be shared by all or a subset of the processes in the system. Embodiments of the invention include an infrastructure for setting up the process state and sending a WD 1584 to a graphics acceleration module 1546 to start a job in a virtualized environment.

In one implementation, the dedicated-process programming model is implementation-specific. In this model, a single process owns the graphics acceleration module 1546 or an individual graphics processing engine 1531. Because the graphics acceleration module 1546 is owned by a single process, the hypervisor initializes the accelerator integration circuit 1536 for the owning partition and the operating system initializes the accelerator integration circuit 1536 for the owning process at the time when the graphics acceleration module 1546 is assigned.

In operation, a WD fetch unit 1591 in the accelerator integration slice 1590 fetches the next WD 1584 which includes an indication of the work to be done by one of the graphics processing engines of the graphics acceleration module 1546. Data from the WD 1584 may be stored in registers 1545 and used by the MMU 1539, interrupt management circuit 1547 and/or context management circuit 1546 as illustrated. For example, one embodiment of the MMU 1539 includes segment/page walk circuitry for accessing segment/page tables 1586 within the OS virtual address space 1585. The interrupt management circuit 1547 may process interrupt events 1592 received from the graphics acceleration module 1546. When performing graphics operations, an effective address 1593 generated by a graphics processing engine 1531-1532, N is translated to a real address by the MMU 1539.

In one embodiment, the same set of registers 1545 are duplicated for each graphics processing engine 1531-1532, N and/or graphics acceleration module 1546 and may be initialized by the hypervisor or operating system. Each of these duplicated registers may be included in an accelerator integration slice 1590. Exemplary registers that may be initialized by the hypervisor are shown in Table 1.

TABLE 1

Hypervisor Initialized Registers

1 Slice Control Register
2 Real Address (RA) Scheduled Processes Area Pointer
3 Authority Mask Override Register
4 Interrupt Vector Table Entry Offset
5 Interrupt Vector Table Entry Limit
6 State Register
7 Logical Partition ID
8 Real address (RA) Hypervisor Accelerator Utilization Record Pointer
9 Storage Description Register Exemplary registers that may be initialized by the operating system are shown in Table 2.

TABLE 2

Operating System Initialized Registers

1 Process and Thread Identification
2 Effective Address (EA) Context Save/Restore Pointer
3 Virtual Address (VA) Accelerator Utilization Record Pointer
4 Virtual Address (VA) Storage Segment Table Pointer
5 Authority Mask
6 Work descriptor In one embodiment, each WD 1584 is specific to a particular graphics acceleration module 1546 and/or graphics processing engine 1531-1532, N. It contains all the information a graphics processing engine 1531-1532, N requires to do its work or it can be a pointer to a memory location where the application has set up a command queue of work to be completed.

Figure 15E:
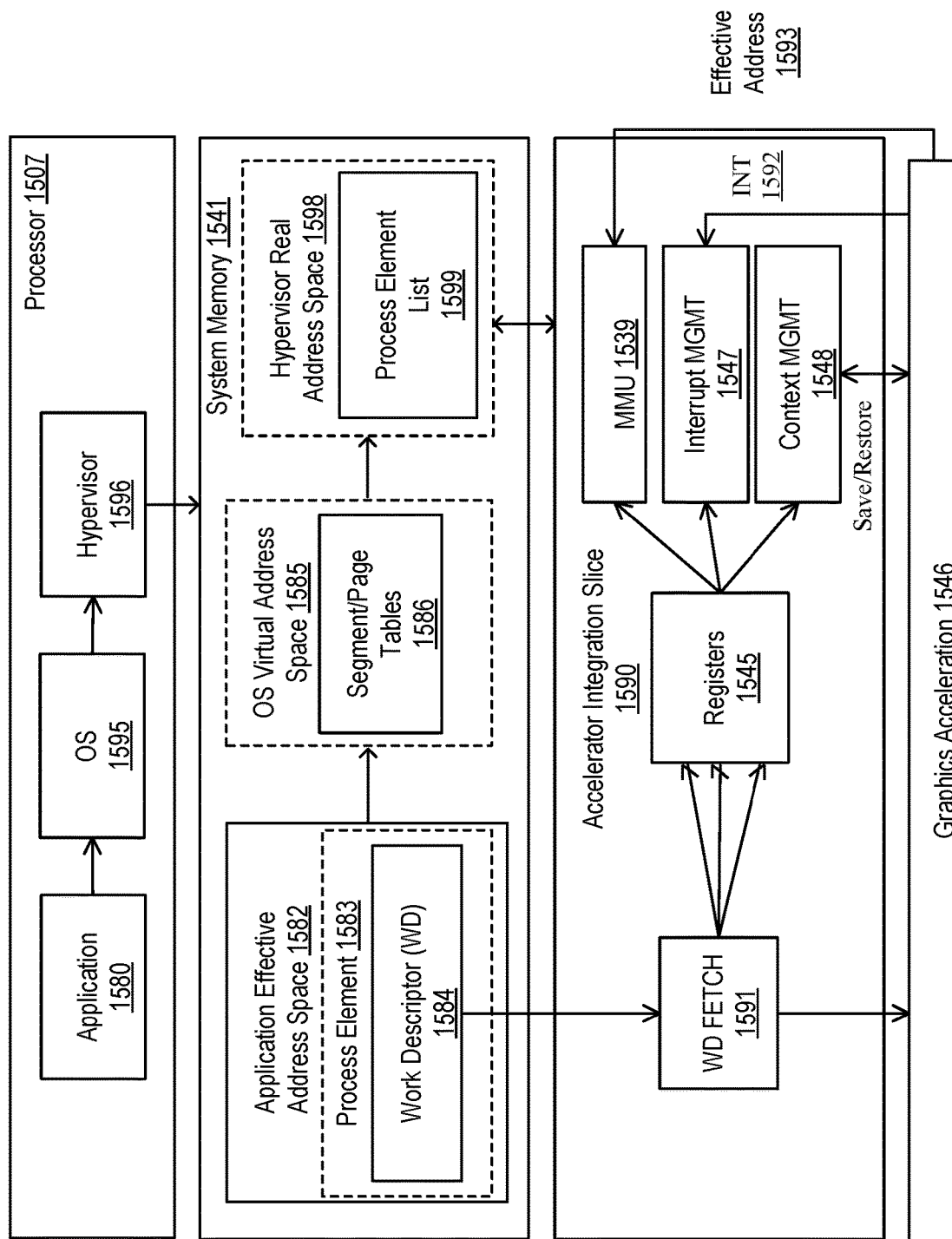

FIG. 15E illustrates additional details for one embodiment of a shared model. This embodiment includes a hypervisor real address space 1598 in which a process element list 1599 is stored. The hypervisor real address space 1598 is accessible via a hypervisor 1596 which virtualizes the graphics acceleration module engines for the operating system 1595.

The shared programming models allow for all or a subset of processes from all or a subset of partitions in the system to use a graphics acceleration module 1546. There are two programming models where the graphics acceleration module 1546 is shared by multiple processes and partitions: time-sliced shared and graphics directed shared.

In this model, the system hypervisor 1596 owns the graphics acceleration module 1546 and makes its function available to all operating systems 1595. For a graphics acceleration module 1546 to support virtualization by the system hypervisor 1596, the graphics acceleration module 1546 may adhere to the following requirements: 1) An application's job request must be autonomous (that is, the state does not need to be maintained between jobs), or the graphics acceleration module 1546 must provide a context save and restore mechanism. 2) An application's job request is guaranteed by the graphics acceleration module 1546 to complete in a specified amount of time, including any translation faults, or the graphics acceleration module 1546 provides the ability to preempt the processing of the job. 3) The graphics acceleration module 1546 must be guaranteed fairness between processes when operating in the directed shared programming model.

In one embodiment, for the shared model, the application 1580 is required to make an operating system 1595 system call with a graphics acceleration module 1546 type, a work descriptor (WD), an authority mask register (AMR) value, and a context save/restore area pointer (CSRP). The graphics acceleration module 1546 type describes the targeted acceleration function for the system call. The graphics acceleration module 1546 type may be a system-specific value. The WD is formatted specifically for the graphics acceleration module 1546 and can be in the form of a graphics acceleration module 1546 command, an effective address pointer to a user-defined structure, an effective address pointer to a queue of commands, or any other data structure to describe the work to be done by the graphics acceleration module 1546. In one embodiment, the AMR value is the AMR state to use for the current process. The value passed to the operating system is similar to an application setting the AMR. If the accelerator integration circuit 1536 and graphics acceleration module 1546 implementations do not support a User Authority Mask Override Register (UAMOR), the operating system may apply the current UAMOR value to the AMR value before passing the AMR in the hypervisor call. The hypervisor 1596 may optionally apply the current Authority Mask Override Register (AMOR) value before placing the AMR into the process element 1583. In one embodiment, the CSRP is one of the registers 1545 containing the effective address of an area in the application's address space 1582 for the graphics acceleration module 1546 to save and restore the context state. This pointer is optional if no state is required to be saved between jobs or when a job is preempted. The context save/restore area may be pinned system memory.

Upon receiving the system call, the operating system 1595 may verify that the application 1580 has registered and been given the authority to use the graphics acceleration module 1546. The operating system 1595 then calls the hypervisor 1596 with the information shown in Table 3.

TABLE 3

OS to Hypervisor Call Parameters

1. A work descriptor (WD)
2. An Authority Mask Register (AMR) value (potentially masked).
3. An effective address (EA) Context Save/Restore Area Pointer (CSRP)
4. A process ID (PID) and optional thread ID (TID)
5. A virtual address (VA) accelerator utilization record pointer (AURP)
6. The virtual address of the storage segment table pointer (SSTP)
7. A logical interrupt service number (LISN)

Upon receiving the hypervisor call, the hypervisor 1596 verifies that the operating system 1595 has registered and been given the authority to use the graphics acceleration module 1546. The hypervisor 1596 then puts the process element 1583 into the process element linked list for the corresponding graphics acceleration module 1546 type. The process element may include the information shown in Table 4.

TABLE 4

Process Element Information

1. A work descriptor (WD)
2. An Authority Mask Register (AMR) value (potentially masked).
3. An effective address (EA) Context Save/Restore Area Pointer (CSRP)
4. A process ID (PID) and optional thread ID (TID)
5. A virtual address (VA) accelerator utilization record pointer (AURP)
6. The virtual address of the storage segment table pointer (SSTP)
7. A logical interrupt service number (LISN)
8. Interrupt vector table, derived from the hypervisor call parameters.
9. A state register (SR) value
10. A logical partition ID (LPID)
11. A real address (RA) hypervisor accelerator utilization record pointer
12. The Storage Descriptor Register (SDR)

In one embodiment, the hypervisor initializes a plurality of accelerator integration slice 1590 registers 1545.

Figure 15F:
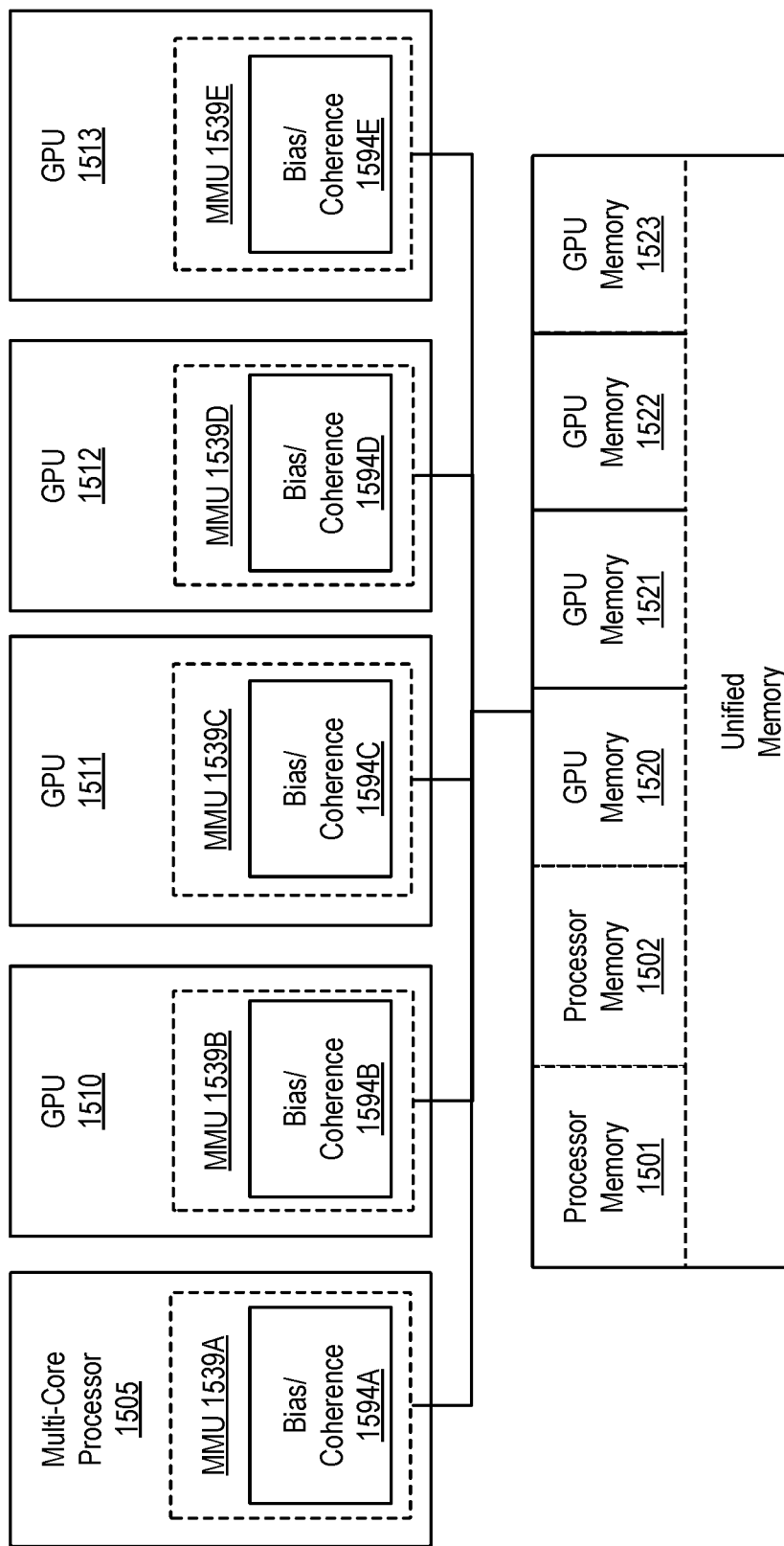

As illustrated in FIG. 15F, one embodiment of the invention employs a unified memory addressable via a common virtual memory address space used to access the physical processor memories 1501-1502 and GPU memories 1520-1523. In this implementation, operations executed on the GPUs 1510-1513 utilize the same virtual/effective memory address space to access the processors memories 1501-1502 and vice versa, thereby simplifying programmability. In one embodiment, a first portion of the virtual/effective address space is allocated to the processor memory 1501, a second portion to the second processor memory 1502, a third portion to the GPU memory 1520, and so on. The entire virtual/effective memory space (sometimes referred to as the effective address space) is thereby distributed across each of the processor memories 1501-1502 and GPU memories 1520-1523, allowing any processor or GPU to access any physical memory with a virtual address mapped to that memory.

In one embodiment, bias/coherence management circuitry 1594A-1594E within one or more of the MMUs 1539A-1539E ensures cache coherence between the caches of the host processors (e.g., 1505) and the GPUs 1510-1513 and implements biasing techniques indicating the physical memories in which certain types of data should be stored. While multiple instances of bias/coherence management circuitry 1594A-1594E are illustrated in FIG. 15F, the bias/coherence circuitry may be implemented within the MMU of one or more host processors 1505 and/or within the accelerator integration circuit 1536.

One embodiment allows GPU-attached memory 1520-1523 to be mapped as part of system memory and accessed using shared virtual memory (SVM) technology, but without suffering the typical performance drawbacks associated with full system cache coherence. The ability to GPU-attached memory 1520-1523 to be accessed as system memory without onerous cache coherence overhead provides a beneficial operating environment for GPU offload. This arrangement allows the host processor 1505 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 1520-1523 without cache coherence overheads can be critical to the execution time of an offloaded computation. In cases with substantial streaming write memory traffic, for example, cache coherence overhead can significantly reduce the effective write bandwidth seen by a GPU 1510-1513. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 1520-1523, with or without a bias cache in the GPU 1510-1513 (e.g., to cache frequently/recently used entries of the bias table). Alternatively, the entire bias table may be maintained within the GPU.

In one implementation, the bias table entry associated with each access to the GPU-attached memory 1520-1523 is accessed prior the actual access to the GPU memory, causing the following operations. First, local requests from the GPU 1510-1513 that find their page in GPU bias are forwarded directly to a corresponding GPU memory 1520-1523. Local requests from the GPU that find their page in host bias are forwarded to the processor 1505 (e.g., over a high-speed link as discussed above). In one embodiment, requests from the processor 1505 that find the requested page in host processor bias complete the request like a normal memory read. Alternatively, requests directed to a GPU-biased page may be forwarded to the GPU 1510-1513. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 1505 bias to GPU bias, but is not required for the opposite transition.

In one embodiment, cache coherency is maintained by temporarily rendering GPU-biased pages uncacheable by the host processor 1505. To access these pages, the processor 1505 may request access from the GPU 1510 which may or may not grant access right away, depending on the implementation. Thus, to reduce communication between the processor 1505 and GPU 1510 it is beneficial to ensure that GPU-biased pages are those which are required by the GPU but not the host processor 1505 and vice versa.

Graphics Processing Pipeline

Figure 16:
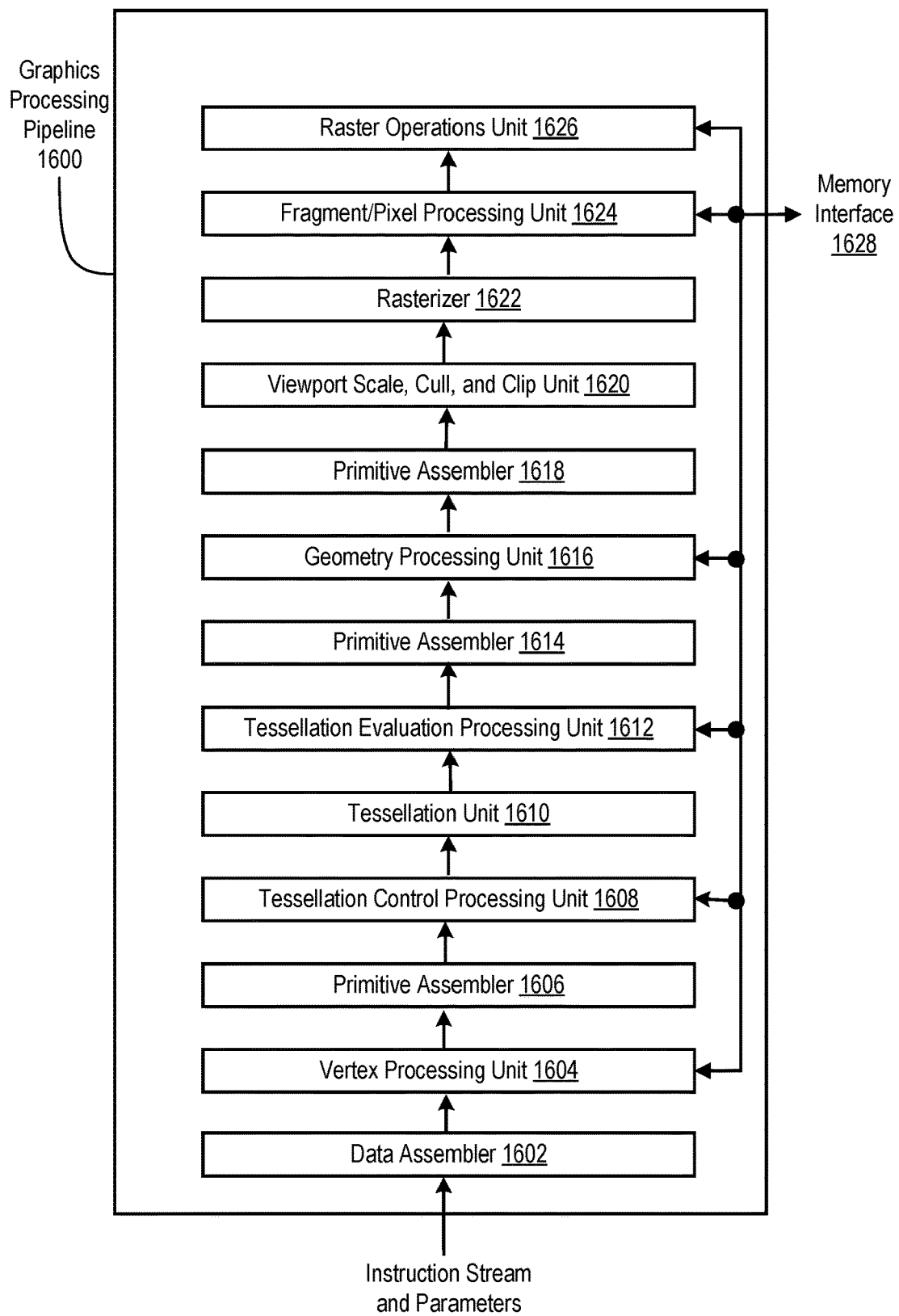
FIG. 16 illustrates a graphics processing pipeline, according to an embodiment.

FIG. 16 illustrates a graphics processing pipeline 1600, according to an embodiment. In one embodiment a graphics processor can implement the illustrated graphics processing pipeline 1600. The graphics processor can be included within the parallel processing subsystems as described herein, such as the parallel processor 1300 of FIG. 13, which, in one embodiment, is a variant of the parallel processor(s) 1212 of FIG. 12. The various parallel processing systems can implement the graphics processing pipeline 1600 via one or more instances of the parallel processing unit (e.g., parallel processing unit 1302 of FIG. 13) as described herein. For example, a shader unit (e.g., graphics multiprocessor 1334 of FIG. 13) may be configured to perform the functions of one or more of a vertex processing unit 1604, a tessellation control processing unit 1608, a tessellation evaluation processing unit 1612, a geometry processing unit 1616, and a fragment/pixel processing unit 1624. The functions of data assembler 1602, primitive assemblers 1606, 1614, 1618, tessellation unit 1610, rasterizer 1622, and raster operations unit 1626 may also be performed by other processing engines within a processing cluster (e.g., processing cluster 1314 of FIG. 13) and a corresponding partition unit (e.g., partition unit 1320A-1320N of FIG. 13). The graphics processing pipeline 1600 may also be implemented using dedicated processing units for one or more functions. In one embodiment, one or more portions of the graphics processing pipeline 1600 can be performed by parallel processing logic within a general-purpose processor (e.g., CPU). In one embodiment, one or more portions of the graphics processing pipeline 1600 can access on-chip memory (e.g., parallel processor memory 1322 as in FIG. 13) via a memory interface 1628, which may be an instance of the memory interface 1318 of FIG. 13.

In one embodiment the data assembler 1602 is a processing unit that collects vertex data for surfaces and primitives. The data assembler 1602 then outputs the vertex data, including the vertex attributes, to the vertex processing unit 1604. The vertex processing unit 1604 is a programmable execution unit that executes vertex shader programs, lighting and transforming vertex data as specified by the vertex shader programs. The vertex processing unit 1604 reads data that is stored in cache, local or system memory for use in processing the vertex data and may be programmed to transform the vertex data from an object-based coordinate representation to a world space coordinate space or a normalized device coordinate space.

A first instance of a primitive assembler 1606 receives vertex attributes from the vertex processing unit 1604. The primitive assembler 1606 readings stored vertex attributes as needed and constructs graphics primitives for processing by tessellation control processing unit 1608. The graphics primitives include triangles, line segments, points, patches, and so forth, as supported by various graphics processing application programming interfaces (APIs).

The tessellation control processing unit 1608 treats the input vertices as control points for a geometric patch. The control points are transformed from an input representation from the patch (e.g., the patch's bases) to a representation that is suitable for use in surface evaluation by the tessellation evaluation processing unit 1612. The tessellation control processing unit 1608 can also compute tessellation factors for edges of geometric patches. A tessellation factor applies to a single edge and quantifies a view-dependent level of detail associated with the edge. A tessellation unit 1610 is configured to receive the tessellation factors for edges of a patch and to tessellate the patch into multiple geometric primitives such as line, triangle, or quadrilateral primitives, which are transmitted to a tessellation evaluation processing unit 1612. The tessellation evaluation processing unit 1612 operates on parameterized coordinates of the subdivided patch to generate a surface representation and vertex attributes for each vertex associated with the geometric primitives.

A second instance of a primitive assembler 1614 receives vertex attributes from the tessellation evaluation processing unit 1612, reading stored vertex attributes as needed, and constructs graphics primitives for processing by the geometry processing unit 1616. The geometry processing unit 1616 is a programmable execution unit that executes geometry shader programs to transform graphics primitives received from primitive assembler 1614 as specified by the geometry shader programs. In one embodiment the geometry processing unit 1616 is programmed to subdivide the graphics primitives into one or more new graphics primitives and calculate parameters used to rasterize the new graphics primitives.

In some embodiments the geometry processing unit 1616 can add or delete elements in the geometry stream. The geometry processing unit 1616 outputs the parameters and vertices specifying new graphics primitives to primitive assembler 1618. The primitive assembler 1618 receives the parameters and vertices from the geometry processing unit 1616 and constructs graphics primitives for processing by a viewport scale, cull, and clip unit 1620. The geometry processing unit 1616 reads data that is stored in parallel processor memory or system memory for use in processing the geometry data. The viewport scale, cull, and clip unit 1620 performs clipping, culling, and viewport scaling and outputs processed graphics primitives to a rasterizer 1622.

The rasterizer 1622 can perform depth culling and other depth-based optimizations. The rasterizer 1622 also performs scan conversion on the new graphics primitives to generate fragments and output those fragments and associated coverage data to the fragment/pixel processing unit 1624. The fragment/pixel processing unit 1624 is a programmable execution unit that is configured to execute fragment shader programs or pixel shader programs. The fragment/pixel processing unit 1624 transforming fragments or pixels received from rasterizer 1622, as specified by the fragment or pixel shader programs. For example, the fragment/pixel processing unit 1624 may be programmed to perform operations included but not limited to texture mapping, shading, blending, texture correction and perspective correction to produce shaded fragments or pixels that are output to a raster operations unit 1626. The fragment/pixel processing unit 1624 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 1626 is a processing unit that performs raster operations including, but not limited to stencil, z test, blending, and the like, and outputs pixel data as processed graphics data to be stored in graphics memory (e.g., parallel processor memory 1322 as in FIG. 13, and/or system memory 1204 as in FIG. 12, to be displayed on the one or more display device(s) 1210 or for further processing by one of the one or more processor(s) 1202 or parallel processor(s) 1212. In some embodiments the raster operations unit 1626 is configured to compress z or color data that is written to memory and decompress z or color data that is read from memory.

Performing Reduction Operations on Vector Elements

A vector may contain multiple data elements that share the same characteristics and they may be combined through reduction operations. For example, the vector may contain data elements with the same values (duplicates). For certain computations, one data element within a set of duplicates has a data dependence that involves another data element within the same set of duplicates. The set of duplicates needs to be identified to allow the computation to be vectorized when a processor operates on the vector. The duplicates may be detected using a conflict detection instruction such as VPCONFLICT.

Particularly, the instruction may test each element of its vector register input for equality with all earlier elements of that input (e.g., all elements closer to the least significant bit (LSB)), and outputs the results of these comparisons as a set of bit vectors. The conflict detection instruction provides a way to determine whether an element has a data dependence that involves other elements within the same register (e.g., a SIMD register). The ability to identify duplicate values within separate elements of the register allows scalar code to be vectorized in cases where possible data dependencies across the register elements might otherwise prevent vectorization.

Prior instruction set architectures (ISAs) use a plurality of instructions to perform reduction operations in multiple steps. For example, one instruction may detect the duplicates within a vector (e.g., by determining a subset of elements with unique indices), and the detection may be performed in SIMD fashion. Then another instruction may perform reduction operations on the duplicates with the same index.

Yet it is desirable for certain operations to be able to implement a single instruction for reduction operations on one or more vectors stored in one or more registers (or other storage units), so that once the single instruction is decoded, it causes a processor to perform the required reduction operations without further instructions. The single instruction to perform the reduction operations results in better compiling and computational efficiency.

Performing Reduction Operations on Vector Elements in One Register

Embodiments of the invention include techniques to perform reduction operations on vector elements in one register using a single instruction. Upon executing the single instruction, the reduction operations may be performed using multiple tree reductions in parallel, one reduction per unique index value, on the element within a register (e.g., a SIMD register). The single instruction may combine the operations performed by multiple earlier operations. For example, the single instruction may order each of the elements that share an index (previously performed by instructions such as VPOPCNT). The single instruction may also iteratively identify and combine partial results from pairs of data elements within the same index (previously performed by instructions such as VPCONFLICT).

Within a register, there may be multiple values that need to be combined via one or more reduction patterns. For example, an application may have a set of values {a0, b0, a1, a2, b1, a3, a4, b2} within a single register that need to be combined so that all of the 'a' values are summed and all of the 'b' values are summed, yielding just two values {a0+a1+a2+a3+a4, b0+b1+b2}. Given a reduction operation with only two inputs (e.g., through an 'add' in a processor), an efficient way to sum all 'a' and 'b' values is to perform multiple binary tree reductions in parallel across the elements of the register.

Some embodiments of the invention generate (1) a first output that identifies the independent reductions and (2) a second output to identify the order (e.g., left vs. right children) of the binary reduction trees. The former may be used to parallelize the reduction operations for the independent reductions and the latter to count the number of instances of each unique index value within an associated index vector.

Figure 17:
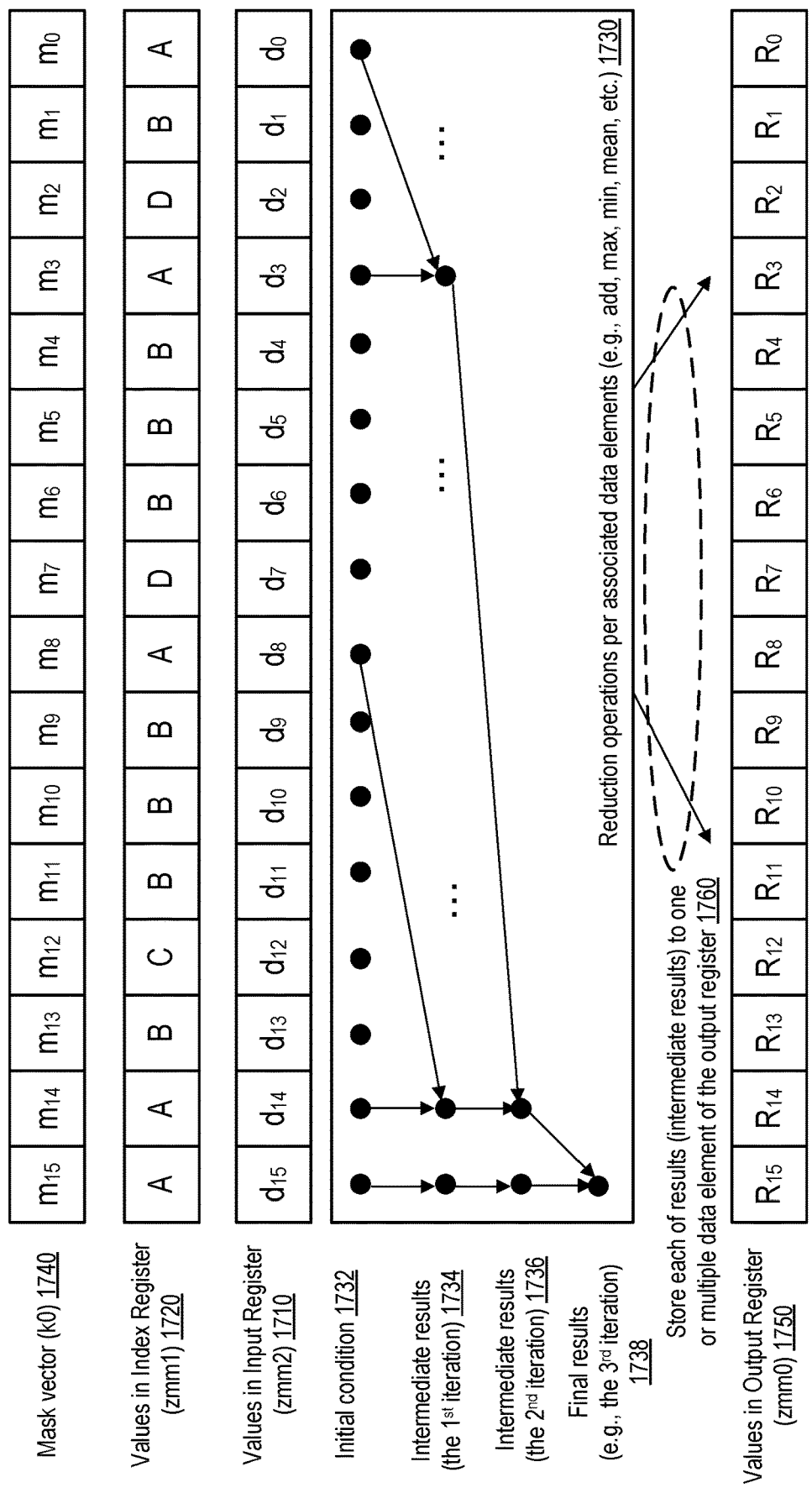
FIG. 17 shows tree reduction operations on a plurality of vector elements stored in an input register upon executing a single instruction per one embodiment of the invention.

FIG. 17 shows tree reduction operations on a plurality of vector elements stored in an input register upon executing a single instruction per one embodiment of the invention. The single instruction takes the format of "vmatchindx zmm0{k0}, zmm1, zmm2" as shown at reference 1700, although many varieties of instruction formats may be implemented, where one or more operand(s) and/or immediate value(s), along with opcode(s) as discussed hereinabove, may be specified for the reduction operations per embodiments of the invention. In some embodiments, the single instruction may be issued as a single-instruction, multiple-data (SIMD) instruction, and additionally/alternatively, the single instruction may be issued as a single-instruction, multiple-thread (SIMT) instruction as discussed herein above relating to FIG. 13.

The reduction operations take values from an input register (zmm2) 1710. The input register 1710 stores values of a set of data elements $d_0$ to $d_{15}$, and the set of data elements may belong to a vector/array/matrix for which the reduction operations may be applied. The input register may be one of the vector registers 514 in FIG. 5 in one embodiment. Each value within the input register 1710 may be considered to be within a lane to be executed using SIMD techniques. The input register 1710 may also be within the register file 1358 of FIG. 13D, where the data elements in the input register may be vectorized for execution by the thread groups (e.g., the warps).

The reduction operations also take values from an index register (zmm1) 1720. The index values indicate which values within the input register are associated with each other. If two data elements within the input register correspond to the same index value, they are involved in the same tree reduction; otherwise they are involved in different tree reductions. For example, $d_0$, $d_3$, $d_8$, $d_{14}$, and $d_{15}$ have the same index value 'A'; $d_1$, $d_4$ to $d_6$, $d_9$ to $d_{11}$, and $d_{13}$ have the same index value 'B'; and $d_2$ and $d_7$ have the same index value 'D.' These data elements with the same index value are involved in respective tree reductions.

The reduction operations are shown at reference 1730, and they may be one or more of obtaining the sum (through "add"), the minimum, the maximum, the mean, the median, the product, the difference (through "subtract"), the occurrence count of associated data elements based on the index values. The reduction operations may be one or more of: accumulation of the associated data element values (via addition, subtraction, or multiplication), selection of a maximum value or minimum value of the associated data element values, and computation of a mean or median value of the associated data element values. Accumulation (specifically, obtaining the sum) is used as an example for the following discussion.

The reduction operations start with the initial condition 1732 of the input register values. A set of iterations may be performed on the associated data elements based on the index values. For example, $d_0$, $d_3$, $d_8$, $d_{14}$, and $d_{15}$ have the same index value 'A' and these values are shown to be reduced through three iterations. For the first iteration at reference 1734, pairs of data elements with the value 'A' (counting from the least significant bit position in this embodiment) are summed together to arrive at the intermediate results 1734. The value at the odd numbered data element will remain the same (e.g., the value of $d_{15}$ in this embodiment). The other data elements with the same index values 'B' and 'D' will go to the same iteration respectively. At the second iteration, the pairs of intermediate results 1734 are summed together again to arrive at the intermediate results 1736. The process continues to reach a single value for each unique index as the result at final results 1738.

The results of the reduction operations are stored at reference 1760 within the output register (zmm0) 1750. The output register 1750 may store the final results 1738, each for a unique index value at the associated data element positions of zmm0. For example, the final result for the index value 'A,' sum (for 'A')=$d_0+d_3+d_8+d_{14}+d_{15}$, may be stored at all associated bit positions in zmm0 at $R_0$, $R_3$, $R_8$, $R_{14}$, and $R_{15}$. Alternatively, the output register may store the final results for the unique index values only to the leftmost (or rightmost, or another predefined) data element position of zmm0 associated with the unique index values, e.g., $R_{15}$ for the index value 'A.' Furthermore, the output register 1750 may alternatively store the results including the intermediate results in the associated data element positions of zmm0. For example, $R_0$ may store $d_0$, $R_3$ store $d_0+d_3$, $R_8$ stores $d_8$, $R_{14}$ stores $d_0+d_3+d_8+d_{14}$, and $R_{15}$ stores $d_0+d_3+d_8+d_{14}+d_{15}$.

Note that while the tree reduction operations use binary trees as example, other types of tree reduction including more data elements per iteration may be implemented as well. Additionally, while the pairing within the tree reduction is from the leftmost pairing rightward, the reverse may be implemented in alternative embodiments.

The reduction operations may additionally take values of a mask vector (k0) in some embodiments. The values may be taken from a mask register or another storage location (e.g., cache or any of the levels of memory hierarchy). A mask value may be set for the input or the output data elements of input register 1710 or output register 1750. When the mask vector is for the input register and a mask value is cleared (e.g., value setting to be '0'), the corresponding data element in the input register is ignored in the reduction operation. Alternatively, the mask vector may be set for the output register and when a mask value is cleared, the corresponding data element in the output register may be set to zero ("zeroing masking") or the original value prior to the reduction operations ("merging masking"). Alternatively, the mask value may be set to be '1' to ignore the corresponding data element in the input register and/or output register in an embodiment.

By using a tree reduction, the reduction iterates, at most, $\log_2 N$ times (N being the number of data elements, the vector length). For example, when all 16 data elements of input register 1710 have the same index value, the reduction operation iterates $\log_2 N=4$ times. This is advantageous over prior approaches, where the reduction operation would iterate N−1 times, one for each serialized reduction.

Additionally, by using a single instruction to perform the reduction operations, the instruction set may be significantly more efficient. The instruction itself may specify a particular reduction operation to be performed (e.g., one or more of obtaining the sum, the minimum, the maximum, the mean, the median, the product, the occurrence count of associated data elements), with specific mask values applied using the mask vector, and the intermediate results may be stored in the output register for future operations. Based on the values in the index register, the reduction operations may be applied to any data element of an input vector loaded into the input register, and the reduction may be performed in parallel using SIMD and/or SIMT techniques thus significantly improve computation efficiency of the processors (e.g., CPU, GPU, or other processor units).

Performing Reduction Operations on Vector Elements in Multiple Registers

Figure 18:
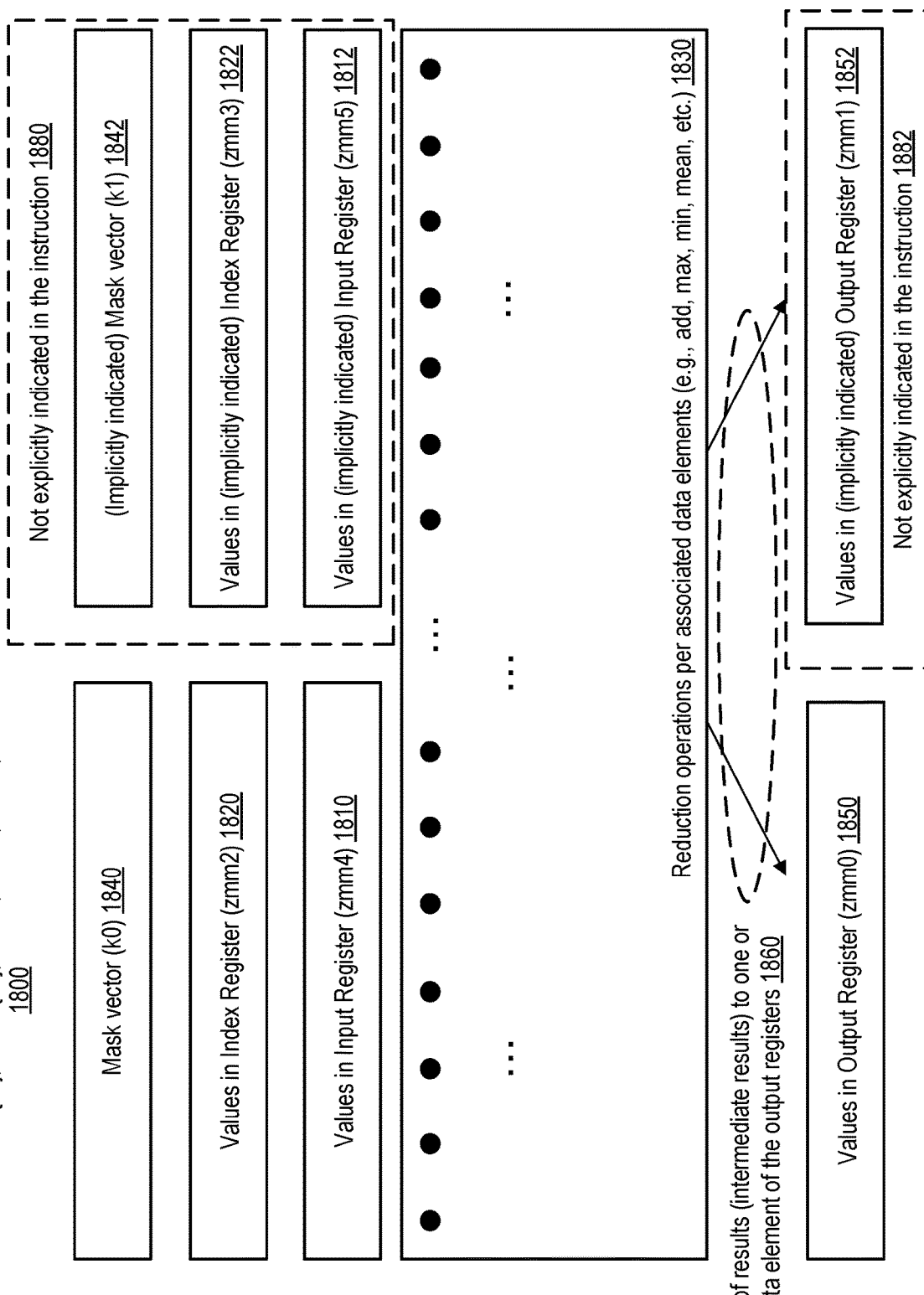
FIG. 18 shows reduction operations on a plurality of vector elements stored in multiple input registers upon executing a single instruction per one embodiment of the invention.

The reduction operations may be extended to vector values stored in multiple registers. FIG. 18 shows reduction operations on a plurality of vector elements stored in multiple input registers upon executing a single instruction per one embodiment of the invention. FIG. 18 is similar to FIG. 17 with some details omitted to focus on the additional details for multiple input register implementation, and the same or similar references indicate elements or components having the same or similar functionalities.

In one embodiment, the single instruction takes the format of "vmatchindx2 zmm0{k0}, zmm1 {k1}, zmm2, zmm3, zmm4, zmm5" as shown at reference 1800. The reduction operations take values from an input register (zmm4) 1810 and an input register (zmm5) 1812, which stores values of a set of data elements that belong to one or more vectors for which the reduction operations may be applied. Each input register 1810/1812 may operate similarly as the input register 1710 in one embodiment. The reduction operations also take values from an index register (zmm2) 1820 and an index register (zmm3) 1822. Each index register may operate similarly as the index register 1720, and if two data elements within the input registers correspond to the same index values, they are involved in the same tree reduction. The reduction operations are shown at reference 1830, operations of which are similar to the one discussed herein above relating to reference 1730.

The results of the reduction operations are stored at reference 1860 within an output register (zmm0) 1850 and an output register (zmm1) 1852. The storing of the results is similar to the operations at reference 1760 as discussed herein above.

Note that many varieties of instruction formats may be implemented for the reduction operations over vector values stored in multiple registers. In an alternative embodiment, the single instruction takes the format of "vmatchindx2 zmm0{k0}, register 1, register 2," where register 1 corresponds to zmm2 and register 2 corresponds to zmm4 in FIG. 18. In this way, the single instruction specifies only one register location for each type of register, yet the processor will operate on two registers for each type of register. For example, while zmm0 may be specified as the output register (e.g., with register number "10"), the processor will also operate on the immediate next output register, zmm1 (e.g., with register number "11"). Thus, zmm1 is an output register that is not explicitly indicated in the single instruction as shown at reference 1882. The explicitly indicated register and implicitly indicated register may be paired to be even/odd pairs, so that if one of a pair of registers are specified in the instruction, the values of the other register in the pair will be operated upon.

Similarly, zmm4 may be specified as the input register, zmm2 as the index register, and k0 as the mask vector in the single instruction; yet the processor will also take input values from zmm5, index values from zmm3, and mask values from mask vector kl, respectively. As shown at reference 1880, these values are not explicitly indicated in the single instruction.

The reduction operations on vector elements are not limited to values within two input registers, and values in additional registers may be operated upon by a single instruction. The reduction operations for vector values over multiple registers may be performed similarly as the ones over two registers such as input registers 1810 and 1812 discussed herein.

Performing Reduction Operations on Vector Elements in Multiple Registers of Different Computing Units A register file of a multiprocessor may be divided between different computing units. For example, the register file may be divided between the different computing units within a multiprocessor for warps or threads (e.g., the register file 1358 may be divided between the different warps being executed by the graphics multiprocessor 1334 as discussed herein above). For vector elements stored in multiple registers of different computing units, the single instruction may explicitly specify each operand (e.g., input register(s), index register(s), mask vector(s), and/or output register(s)) as discussed herein. The instruction may explicitly identify all the operands (e.g., registers and mask vector) when the software/multiprocessor knows the full set of registers available to all threads/warps (e.g., a graphics multiprocessor typically does).

When the software/multiprocessor does not have the knowledge, alternative embodiments may be implemented. For example, the single instruction may take the format of "vmatchindx2 zmm0{k0}, zmm1, zmm2, reg/imm," where the "reg/imm" operand specifies a register (or another storage location such as a cache/memory in the memory hierarchy) or an immediate value that identifies values for a second thread or warp. The software/multiprocessor knows about the earlier operands (zmm0, zmm1, zmm2, k0) for a first thread or warp, and "reg/imm" may hold the identifier of the second thread or warp, for which the other input/index/output registers and mask vector hold values for the reduction operations. Alternatively, "reg/imm" may specify an offset from the first thread or warp. For example, if a thread X executes the single instruction, the single instruction may be executed with the combined information from thread X+reg/imm Furthermore, the registers for the single instruction may be specified using virtual register numbers for the registers, and the software/multiprocessor translates the virtual register numbers for each thread or warp to physical register numbers. Multiprocessors today have a notion of both logical/architectural registers and physical registers. If the single instruction specifies an output register number "10," a multiprocessor may identify the physical register "10" for each thread/warp. Such translation is straightforward for some multiprocessors (e.g., CPUs). For other multiprocessors (e.g., GPUs), a multiprocessor knows that the total number of registers that a thread/warp needs and allocates a contiguous chunk of registers for each thread/warp accordingly. For example, the multiprocessor may allocate registers 0 to N−1 to thread/warp 0, N to 2N−1 to warp 1, and so on. Each thread/warp has a starting point in the register file. The multiprocessor may find the physical register corresponding to a specified virtual register for a warp by adding the offset for the thread/warp (e.g., thread/warp number * offset+specified virtual register). Thus, the single instruction may be used for reduction operations across input values in multiple input registers, even when the multiple input registers are not identified explicitly in the single instruction.

When the reduction operations are performed using multiple computing units within a multiprocessor for warps or threads, synchronization between the multiple computing units may be needed. The synchronization may be achieved using barriers to ensure that the warps and threads have their information ready for combining. For example, an instruction such as DMB (data memory barrier), DSB (data synchronization barrier), or ISB (instruction synchronization barrier) may be used in some embodiments.

Alternatively, the single instruction may implement synchronization without using any additional instructions. For example, the single instruction may take the format of "vmatchindx2 zmm0{k0}, zmm1, zmm2, sync_reg/imm," where the "sync_reg/imm" operand specifies a location (a register or another storage location such as a cache/memory in the memory hierarchy) that the warps/threads will use to synchronize. Assuming two warps/threads are involved in the reduction operations. The two warps/threads will execute the single instruction, and they will have the same value for "sync_reg/imm" The specified location will be initialized to an initial value, before the involved warps/threads execute the instruction. When the first thread/warp executes the instruction, it may check the specified location. As it sees that the specified location contains the initial value, it overwrites the location with another value, indicating that it has arrived, and that it is waiting for the second warp/thread. Then when the second thread/warp executes the instruction, it checks the specified location again. As it determines that the specified location does not contain the initial value, the determination triggers the execution of the combining operation across the different computing units. When the combining operation is complete, both threads/warps are allowed to proceed.

When more than two warps/threads are involved in the reduction operations, a value in the specified location may indicates to a warp/thread that the warp/thread is the last one to arrive, and value triggers the execution of the combing operation across the different computing units, and all the thread/warps are allowed to proceed when the combining operation is complete.

Figure 19:
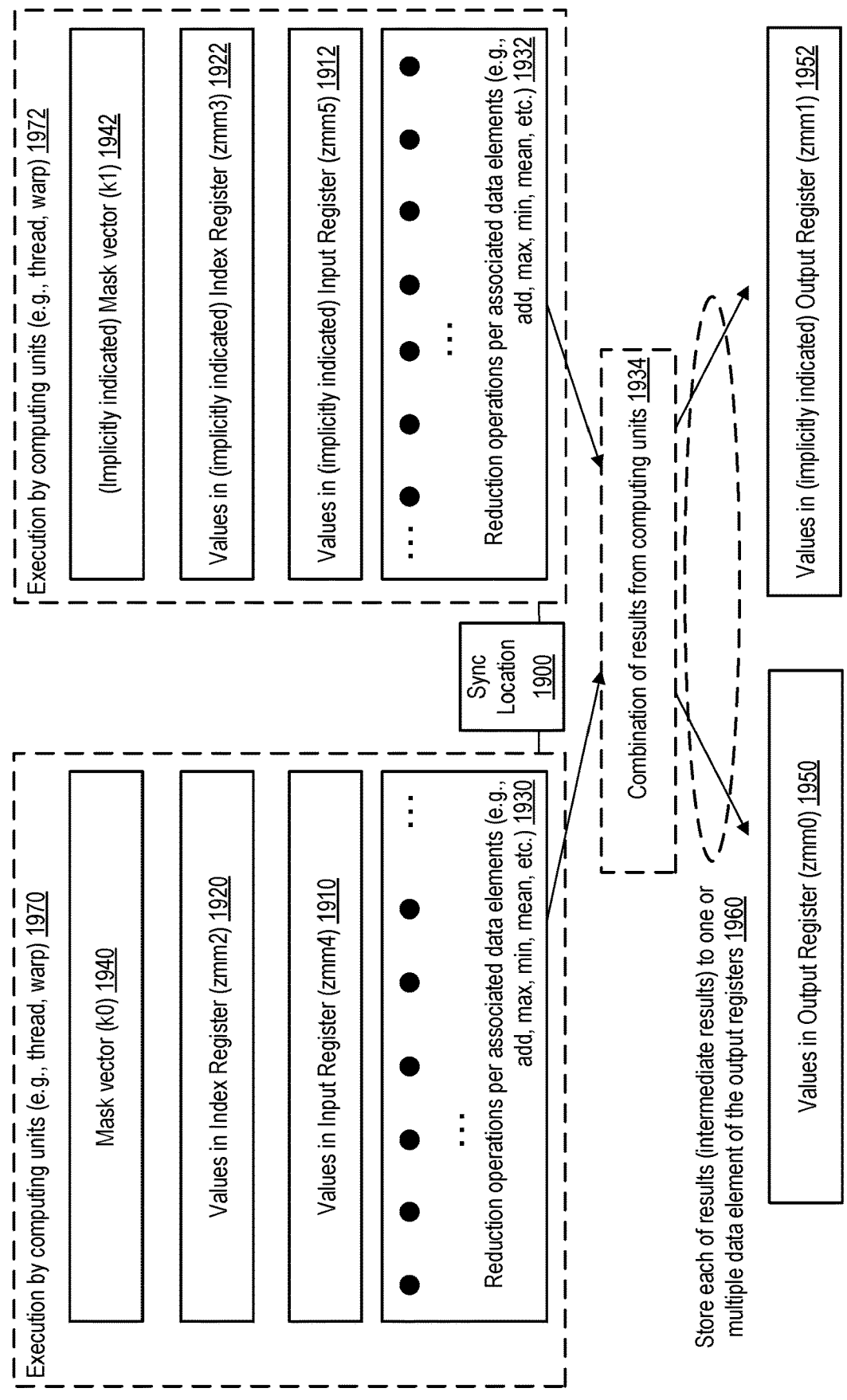
FIG. 19 shows reduction operations on a plurality of vector elements stored in multiple input registers upon using synchronization executing a single instruction per one embodiment of the invention.

FIG. 19 shows reduction operations on a plurality of vector elements stored in multiple input registers upon using synchronization executing a single instruction per one embodiment of the invention. FIG. 19 is similar to FIG. 18 with some details omitted to focus on the additional details for multiple input register implementation, and the same or similar references indicate elements or components having the same or similar functionalities.

A portion of the vector elements is executed by a first set of computing units at reference 1970, while other portion of the vector elements are executed by other sets of computing units as shown at reference 1972. Different sets of computing units may use different parts of a register file of a multiprocessor (e.g., a CPU/GPU). Additionally, the optional mask vectors 1940 and 1942 used to execute the single instruction for reduction operations may be stored using the different part of the register file as well.

The single instruction (e.g., "vmatchindx2 zmm0{k0}, zmm1, zmm2, sync_reg/imm" as discussed above) may specify a synchronization location 1900, which indicates to the computing units that are involved in the reduction operations whether synchronization between the involved computing units are achieved. Once the synchronization is achieved, the combining operation may be performed at reference 1934, where the combined results from the computing units may be completed. Once the combination is complete, the results may be stored in the output registers 1950 and 1952 as shown at reference 1960.

Through using the synchronization indication in the single instruction, embodiments of the invention do not require additional instructions to achieve synchronized reduction around vector elements stored in multiple registers at different portions of a register file. The single instruction is thus more efficient than multiple instructions in achieving the synchronization.

Some Embodiments of the Invention

Figure 20:
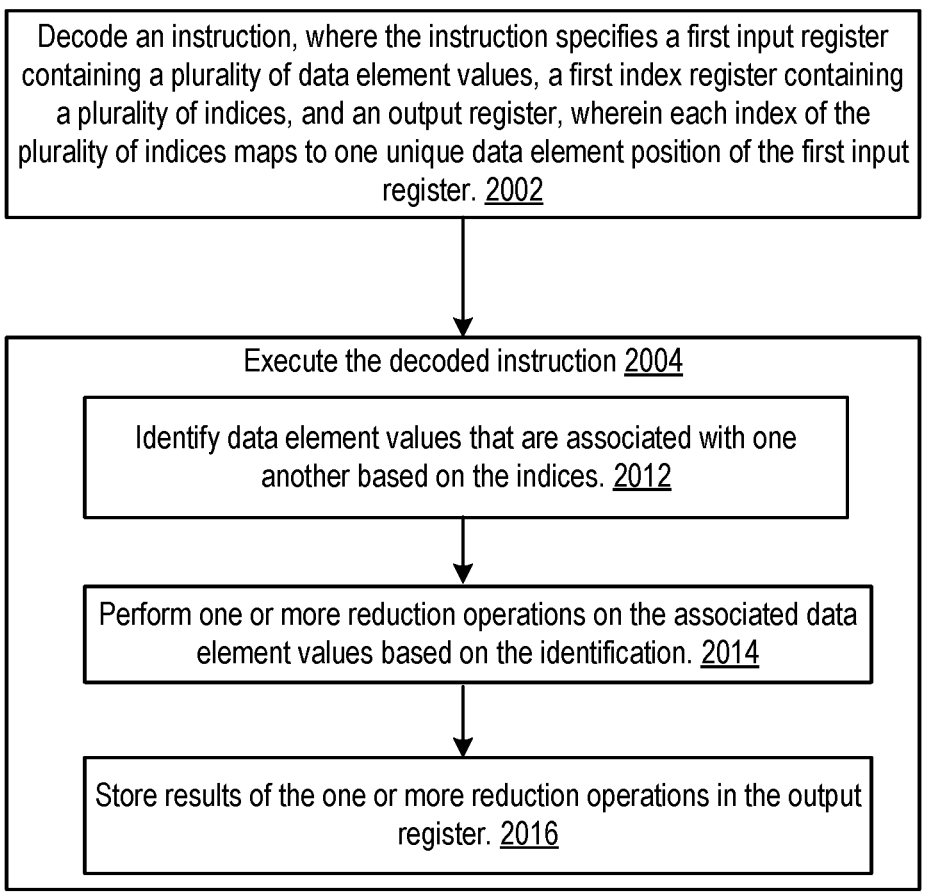
FIG. 20 is a flow diagram showing reduction operations on a plurality of vector elements upon executing a single instruction per one embodiment of the invention.

FIG. 20 is a flow diagram showing reduction operations on a plurality of vector elements upon executing a single instruction per one embodiment of the invention. Method 2000 may be performed on a processor, which contains decoding circuitry and execution circuitry. At reference 2002, the decoding circuitry decodes an instruction, where the instruction specifies a first input register containing a plurality of data element values, a first index register containing a plurality of indices, and an output register. Each index of the plurality of indices maps to one unique data element position of the first input register. While several instruction examples are given herein relating to FIGS. 17-19, many varieties of instruction formats may be implemented, where one or more operand(s) and/or immediate value(s), along with opcode(s) as discussed hereinabove, may be specified for the reduction operations per embodiments of the invention.

The instruction is for performing reduction operations over the plurality of vector elements, which may belong to an array/matrix. The operation code (opcode) of the instruction specifies one or more reduction operations. The reduction operations may be one or more of: accumulation of the associated data element values, selection of a maximum value or minimum value of the associated data element values, and computation of a mean or median value of the associated data element values. Accumulation (obtaining the sum) is used as an example for the following discussion.

In some embodiments, the instruction further specifies a mask vector containing a plurality of masks, where each mask indicates a data element position of the output register being active or inactive, and where the results do not write to the data element position that is inactive. In alternative embodiment, each mask indicates a data element position of the input register being active or inactive, and the inactive data elements are not involved in the reduction operation caused by the instruction.

At reference 2004, the execution circuitry executes the decoded instruction. The execution includes identifying data element values that are associated with one another based on the indices at reference 2012. Then at reference 2014, the execution circuitry performs one or more reduction operations on the associated data element values based on the identification; and at reference 2016, the results of the one or more reduction operations are stored in the output register.

In one embodiment, a group of data element values are associated with one another when the group of data element values have a same index value. In one embodiment, to perform the one or more reduction operations is to, for the group of data element values sharing the same index value, combine the group of data element values to generate an arithmetic combination as a result. The arithmetic combination may include obtaining the sum (through "add"), the difference (through "subtract"), the minimum, the maximum, the mean, the median, the product, the occurrence count of associated data elements based on the index values.

In one embodiment, the results are stored in a plurality of data element positions of the output register, each data element position corresponding to one of corresponding associated data element values. In one embodiment, the one or more reduction operations are performed in a plurality of iterations on a group of associated data element values, and intermediate results of the plurality of iterations are stored in data element positions corresponding to ones of corresponding associated data element values involved in getting the intermediate results, as explained herein relating to FIG. 17.

In one embodiment, the execution of the decoded instruction is additionally performed on a second input register, and another plurality of data element values within the second input register and another plurality of indices within a second index register are used in performing the one or more reduction operations. In one embodiment, the instruction further specifies a second input register containing another plurality of data element values, and a second index register containing another plurality of indices, each index of the other plurality of indices maps to one unique data element position of the second input register, and the one or more reduction operations are performed on the data element values of the first and second input registers based on indices of the first and second index registers. These embodiments are discussed in more details herein relating to FIG. 18.

In one embodiment, the instruction is executed by two or more computing units. In one embodiment, each of the two or more computing units is a warp or a thread. In one embodiment, the two or more computing units are synchronized in performing the one or more reduction operations. In one embodiment, the instruction further specifies a location that stores a value indicating whether the two or more computing units are synchronized. In one embodiment, the processor is a graphics processing unit (GPU). These embodiments are discussed in more details herein relating to FIG. 19.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims which follow.

What is claimed is:

1. A processor comprising:
   decoding circuitry to decode an instruction, wherein the instruction specifies a first input register containing a plurality of data element values, a first index register containing a first plurality of indices, and an output register, wherein each index of the first plurality of indices maps to one unique data element position of the first input register; and
   execution circuitry to execute the decoded instruction, wherein the execution is performed based on the first input register and a second input register, wherein another plurality of data element values within the second input register and a second plurality of indices within a second index register are used to perform the execution, wherein the second input and index registers are identified explicitly or implicitly by the instruction, and wherein the execution includes to:
      identify data element values that are associated with one another in the first and second input registers as a plurality of groups based on the first and second plurality of indices, wherein in the plurality of groups, a group of associated data element values being associated with one another when the group of associated data element values have a same index value,
      perform reduction operations on the plurality of groups of associated data element values in the first and second input registers based on the identification, wherein each reduction operation is performed on a respective group of associated data element values, and wherein at least one of the reduction operations is performed on one group of associated data element values from both of the first and second input registers, and
      store results of the reduction operations in the output register and another output register,
      wherein the reduction operations are performed on the plurality of groups of associated data element values by two or more computing units of the execution circuitry in parallel.

2. The processor of claim 1, wherein operation code (opcode) of the instruction specifies the reduction operations.

3. The processor of claim 1, wherein for the respective group of associated data element values, to perform a corresponding reduction operation is to combine the respective group of data element values to generate an arithmetic combination as a result.

4. The processor of claim 1, wherein the results are stored in a plurality of data element positions of the output register, each data element position corresponding to one of corresponding associated data element values.

5. The processor of claim 1, wherein a corresponding reduction operation is performed in a plurality of iterations on the respective group of associated data element values, and intermediate results of the plurality of iterations are stored in data element positions corresponding to ones of corresponding associated data element values involved in getting the intermediate results.

6. The processor of claim 1, wherein a corresponding reduction operation for the respective group of associated data element values comprises one or more of:
   accumulation of the respective group of associated data element values,
   selection of a maximum value or minimum value of the respective group of associated data element values, and
   computation of a mean or median value of the respective group of associated data element values.

7. The processor of claim 1, wherein the instruction further specifies a mask vector containing a plurality of mask values, wherein each mask value indicates a data element position of the output register being active or inactive, and wherein the results do not write to the data element position that is inactive.

8. The processor of claim 1, wherein the instruction further specifies the second input register containing the another plurality of data element values, and the second index register containing the second plurality of indices, each index of the second plurality of indices mapping to one unique data element position of the second input register, and wherein a corresponding reduction operation for the respective group of associated data element values is performed on the data element values of the first and second input registers based on the first and second plurality of indices of the first and second index registers.

9. The processor of claim 1, wherein each of the two or more computing units is a warp or a thread.

10. The processor of claim 1, wherein the two or more computing units are synchronized in performing the reduction operations.

11. The processor of claim 10, wherein the instruction further specifies a location that stores a value indicating whether the two or more computing units are synchronized.

12. The processor of claim 1, wherein the processor is a graphics processing unit (GPU).

13. A method comprising:
   decoding an instruction, wherein the instruction specifies a first input register containing a plurality of data element values, a first index register containing a first plurality of indices, and an output register, wherein each index of the first plurality of indices maps to one unique data element position of the first input register; and executing the decoded instruction, by execution circuitry, wherein the execution is performed based on the first input register and a second input register, wherein another plurality of data element values within the second input register and a second plurality of indices within a second index register are used to perform the execution, wherein the second input and index registers are identified explicitly or implicitly by the instruction, and wherein the execution includes to:
  identify data element values that are associated with one another in the first and second input registers as a plurality of groups based on the first and second plurality of indices, wherein in the plurality of groups, a group of associated data element values being associated with one another when the group of associated data element values have a same index value,
  perform reduction operations on the plurality of groups of associated data element values in the first and second input registers based on the identification, wherein each reduction operation is performed on a respective group of associated data element values, and wherein at least one of the reduction operations is performed on one group of associated data element values from both of the first and second input registers, and
  store results of the one or more same reduction operations in the output register and another output register,
  wherein the reduction operations are performed on the plurality of groups of associated data element values by two or more computing units of the execution circuitry in parallel.

14. The method of claim 13, wherein for the respective group of associated data element values, to perform a corresponding reduction operation is to combine the respective group of data element values to generate an arithmetic combination as a result.

15. The method of claim 13, wherein the results are stored in a plurality of data element positions of the output register, each data element position corresponding to one of corresponding associated data element values.

16. The method of claim 13, wherein a corresponding reduction operation is performed in a plurality of iterations on the respective group of associated data element values, and intermediate results of the plurality of iterations are stored in data element positions corresponding to ones of corresponding associated data element values involved in getting the intermediate results.

17. The method of claim 13, wherein a corresponding reduction operation for the respective group of associated data element values comprises one or more of:

accumulation of the respective group of associated data element values,
selecting a maximum value or minimum value of the respective group of associated data element values, and
computing a mean or median value of the respective group of associated data element values.

18. A non-transitory machine-readable medium storing an instruction, which when executed by a processor causes the processor to perform operations, the operations comprising:
  decoding the instruction, wherein the instruction specifies a first input register containing a plurality of data element values, a first index register containing a first plurality of indices, and an output register, wherein each index of the first plurality of indices maps to one unique data element position of the first input register; and
  executing the decoded instruction, by execution circuitry, wherein the execution is performed based on the first input register and a second input register, wherein another plurality of data element values within the second input register and a second plurality of indices within a second index register are used in performing the execution, wherein the second input and index registers are identified explicitly or implicitly by the instruction, and wherein the execution includes to:
    identify data element values that are associated with one another in the first and second input registers as a plurality of groups based on the first and second plurality of indices, wherein in the plurality of groups, a group of associated data element values being associated with one another when the group of associated data element values have a same index value,
    perform one or more same reduction operations on the plurality of groups of associated data element values in the first and second input registers based on the identification, wherein each reduction operation is performed on a respective group of associated data element values, and wherein at least one of the reduction operations is performed on one group of associated data element values from both of the first and second input registers, and
    store results of the one or more same reduction operations in the output register and another output register,
    wherein the reduction operations are performed on the plurality of groups of associated data element values by two or more computing units of the execution circuitry in parallel.

* * * * *